United States Patent
Ladd et al.

(10) Patent No.: US 9,674,287 B2
(45) Date of Patent: *Jun. 6, 2017

(54) METHODS AND APPARATUS FOR EVENT LOGGING IN AN INFORMATION NETWORK

(71) Applicant: Time Warner Cable Enterprises LLC

(72) Inventors: Patrick Ladd, San Marcos, CA (US); George Sarosi, Niwot, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 14/451,303

(22) Filed: Aug. 4, 2014

(65) Prior Publication Data
US 2015/0026335 A1    Jan. 22, 2015

Related U.S. Application Data

(60) Continuation of application No. 13/685,499, filed on Nov. 26, 2012, now Pat. No. 8,799,723, which is a
(Continued)

(51) Int. Cl.
*G06F 11/00* (2006.01)
*H04L 29/08* (2006.01)
(Continued)

(52) U.S. Cl.
CPC .......... *H04L 67/16* (2013.01); *G06F 11/2268* (2013.01); *G06F 11/3476* (2013.01);
(Continued)

(58) Field of Classification Search
CPC .............. G06F 11/2268; G06F 11/3476; G06F 11/3495; G06F 9/5022; G06F 9/5038;
(Continued)

(56) References Cited

U.S. PATENT DOCUMENTS 3,999,051 A    12/1976   Petschauer
4,339,657 A    7/1982    Larson et al.
(Continued)

FOREIGN PATENT DOCUMENTS

WO    WO-0024192 A1    4/2000
WO    WO-0213039 A1    2/2002

OTHER PUBLICATIONS

8th IEEE International Conference on Communication Systems Singapore, Nov. 25-28, 2002 The use of Dynamically Reconfigurable Protocol Stacks for StreamingMultimedia to Mobile Devices by Kevin Curran and Gerard Parr http://www.infm.ulst.ac.uk/.about.kevin/pubs.htm.
(Continued)

*Primary Examiner* — Marc Duncan
(74) *Attorney, Agent, or Firm* — Gardzinski & Associates, PC

(57) ABSTRACT

Methods and apparatus for logging, analysis, and reporting of events such as reboots in a client device (e.g., consumer premises equipment in a cable network) using applications. In one aspect, an improved event logging and monitoring system is provided within the device with which the application(s) can interface to record event or error data. In one exemplary embodiment, the client device comprises a digital set-top box having Java-enabled middleware adapted to implement the various functional aspects of the event logging system, which registers to receive event notifications (including resource exhaustion data) from other applications running on the device. The network operator can also optionally control the operation of the logging system remotely via a network agent. Improved client device and network configurations, as well as methods of operating these systems, are also disclosed.

22 Claims, 7 Drawing Sheets

Related U.S. Application Data continuation of application No. 13/236,487, filed on Sep. 19, 2011, now Pat. No. 8,321,723, which is a continuation of application No. 12/717,097, filed on Mar. 3, 2010, now Pat. No. 8,046,636, which is a continuation of application No. 11/897,742, filed on Aug. 31, 2007, now Pat. No. 7,698,606, which is a division of application No. 10/722,206, filed on Nov. 24, 2003, now Pat. No. 7,266,726.

(51) Int. Cl.
| | | |
|---|---|---|
| *G06F 11/22* | (2006.01) | |
| *G06F 11/34* | (2006.01) | |
| *H04L 12/24* | (2006.01) | |
| *H04N 17/00* | (2006.01) | |
| *H04L 12/26* | (2006.01) | |

(52) U.S. Cl.
CPC .............. *H04L 41/06* (2013.01); *H04L 41/50* (2013.01); *H04L 43/0876* (2013.01); *H04N 17/00* (2013.01); *G06F 11/3495* (2013.01); *Y10T 477/688* (2015.01)

(58) Field of Classification Search
CPC . G06F 9/485; G06F 8/62; H04L 67/16; H04L 43/0876; H04L 41/06; H04L 41/50; H04L 47/74; H04N 17/00; H04N 17/004; H04N 17/04; H04N 21/443; H04N 21/4431; H04N 21/4433; H04N 21/4435
See application file for complete search history.

(56) References Cited

U.S. PATENT DOCUMENTS

| | | |
|---|---|---|
| 4,574,364 A | 3/1986 | Tabata et al. |
| 4,604,751 A | 8/1986 | Aichelmann, Jr. et al. |
| 4,692,757 A | 9/1987 | Tsuhara et al. |
| 4,710,761 A | 12/1987 | Kapur et al. |
| 4,845,644 A | 7/1989 | Anthias et al. |
| 4,890,098 A | 12/1989 | Dawes et al. |
| 4,890,257 A | 12/1989 | Anthias et al. |
| 5,113,517 A | 5/1992 | Beard et al. |
| 5,121,475 A | 6/1992 | Child et al. |
| 5,129,055 A | 7/1992 | Yamazaki et al. |
| 5,155,731 A | 10/1992 | Yamaguchi |
| 5,175,813 A | 12/1992 | Golding et al. |
| 5,245,615 A | 9/1993 | Treu |
| 5,276,437 A | 1/1994 | Horvath et al. |
| 5,408,602 A | 4/1995 | Giokas et al. |
| 5,463,768 A | 10/1995 | Cuddihy et al. |
| 5,487,143 A | 1/1996 | Southgate |
| 5,502,839 A | 3/1996 | Kolnick |
| 5,522,025 A | 5/1996 | Rosenstein |
| 5,564,002 A | 10/1996 | Brown |
| 5,581,686 A | 12/1996 | Koppolu et al. |
| 5,596,702 A | 1/1997 | Stucka et al. |
| 5,621,879 A | 4/1997 | Kohda |
| 5,664,046 A | 9/1997 | Abecassis |
| 5,673,403 A | 9/1997 | Brown et al. |
| 5,675,755 A | 10/1997 | Trueblood |
| 5,692,142 A | 11/1997 | Craycroft et al. |
| 5,734,380 A | 3/1998 | Adams et al. |
| 5,764,230 A | 6/1998 | Baradel et al. |
| 5,790,779 A | 8/1998 | Ben-Natan et al. |
| 5,831,609 A | 11/1998 | London et al. |
| 5,850,544 A | 12/1998 | Parvathaneny et al. |
| 5,856,826 A | 1/1999 | Craycroft |
| 5,862,316 A | 1/1999 | Hagersten et al. |
| 5,867,160 A | 2/1999 | Kraft, IV et al. |
| 5,874,960 A | 2/1999 | Mairs et al. |
| 5,877,755 A | 3/1999 | Hellhake |
| 5,895,472 A | 4/1999 | Brodsky et al. |
| 5,973,702 A | 10/1999 | Orton et al. |
| 5,995,103 A | 11/1999 | Ashe |
| 6,031,530 A | 2/2000 | Trueblood |
| 6,092,107 A | 7/2000 | Eleftheriadis et al. |
| 6,160,872 A | 12/2000 | Karnowski et al. |
| 6,169,725 B1 | 1/2001 | Gibbs et al. |
| 6,181,713 B1 | 1/2001 | Patki et al. |
| 6,192,403 B1 | 2/2001 | Jong et al. |
| 6,216,152 B1 | 4/2001 | Wong et al. |
| 6,219,044 B1 | 4/2001 | Ansberry et al. |
| 6,233,611 B1 | 5/2001 | Ludtke et al. |
| 6,252,889 B1 | 6/2001 | Patki et al. |
| 6,313,880 B1 | 11/2001 | Smyers et al. |
| 6,317,881 B1 | 11/2001 | Shah-Nazaroff et al. |
| 6,330,010 B1 | 12/2001 | Nason et al. |
| 6,336,122 B1 | 1/2002 | Lee et al. |
| 6,337,717 B1 | 1/2002 | Nason et al. |
| 6,366,876 B1 | 4/2002 | Looney |
| 6,381,710 B1 | 4/2002 | Kim |
| 6,381,735 B1 | 4/2002 | Hunt |
| 6,397,262 B1 | 5/2002 | Hayden et al. |
| 6,430,570 B1 * | 8/2002 | Judge ................ G06F 9/44594 707/769 |
| 6,456,892 B1 | 9/2002 | Dara-Abrams et al. |
| 6,460,141 B1 | 10/2002 | Olden |
| 6,469,742 B1 | 10/2002 | Trovato et al. |
| 6,496,864 B1 * | 12/2002 | McCartney ........... G06F 9/4843 709/205 |
| 6,505,298 B1 | 1/2003 | Cerbini et al. |
| 6,510,152 B1 | 1/2003 | Gerszberg et al. |
| 6,529,965 B1 | 3/2003 | Thomsen et al. |
| 6,532,552 B1 | 3/2003 | Benignus et al. |
| 6,542,500 B1 | 4/2003 | Gerszberg et al. |
| 6,546,016 B1 | 4/2003 | Gerszberg et al. |
| 6,600,958 B1 | 7/2003 | Zondag |
| 6,606,711 B2 | 8/2003 | Andrews et al. |
| 6,625,274 B1 | 9/2003 | Hoffpauir et al. |
| 6,630,943 B1 | 10/2003 | Nason et al. |
| 6,631,350 B1 | 10/2003 | Celi, Jr. et al. |
| 6,631,403 B1 | 10/2003 | Deutsch et al. |
| 6,651,248 B1 | 11/2003 | Alpern |
| 6,654,722 B1 | 11/2003 | Aldous et al. |
| 6,687,735 B1 | 2/2004 | Logston et al. |
| 6,714,534 B1 | 3/2004 | Gerszberg et al. |
| 6,750,879 B2 | 6/2004 | Sandberg |
| 6,762,796 B1 | 7/2004 | Nakajoh et al. |
| 6,762,798 B1 | 7/2004 | Messer et al. |
| 6,802,056 B1 | 10/2004 | Chaiken et al. |
| 6,847,649 B2 | 1/2005 | Sutanto |
| 6,850,533 B2 | 2/2005 | Gerszberg et al. |
| 6,856,330 B1 | 2/2005 | Chew et al. |
| 6,873,877 B1 | 3/2005 | Tobias et al. |
| 6,895,573 B2 | 5/2005 | Norgaard et al. |
| 6,938,254 B1 * | 8/2005 | Mathur ............... G06F 9/44594 718/104 |
| 6,941,341 B2 | 9/2005 | Logston et al. |
| 6,944,185 B2 | 9/2005 | Patki et al. |
| 6,948,175 B1 | 9/2005 | Fong et al. |
| 6,948,183 B1 | 9/2005 | Peterka |
| 6,952,836 B1 | 10/2005 | Donlan et al. |
| 6,968,364 B1 | 11/2005 | Wong et al. |
| 6,973,050 B2 | 12/2005 | Birdwell et al. |
| 6,996,808 B1 | 2/2006 | Niewiadomski et al. |
| 7,010,796 B1 | 3/2006 | Strom et al. |
| 7,039,633 B1 | 5/2006 | Dey et al. |
| 7,055,146 B1 | 5/2006 | Durr et al. |
| 7,058,964 B2 | 6/2006 | Khandelwal et al. |
| 7,068,597 B1 | 6/2006 | Fijolek et al. |
| 7,080,356 B2 | 7/2006 | Atallah et al. |
| 7,096,459 B2 | 8/2006 | Keller et al. |
| 7,111,072 B1 | 9/2006 | Matthews et al. |
| 7,137,106 B2 | 11/2006 | Herman et al. |
| 7,146,305 B2 | 12/2006 | Van Der Made |
| 7,158,993 B1 | 1/2007 | Schwabe |
| 7,181,725 B1 | 2/2007 | Posegga et al. |
| 7,194,249 B2 | 3/2007 | Phillips et al. |
| 7,203,869 B2 | 4/2007 | Gwak |
| 7,213,213 B2 | 5/2007 | Sekiguchi et al. |
| 7,216,170 B2 | 5/2007 | Ludvig et al. |

(56) References Cited

U.S. PATENT DOCUMENTS

| | | | |
|---|---|---|---|
| 7,240,104 B2* | 7/2007 | Gautney | H04L 67/125 |
| | | | 455/419 |
| 7,266,726 B1* | 9/2007 | Ladd | G06F 11/2268 |
| | | | 714/27 |
| 7,290,253 B1 | 10/2007 | Agesen | |
| 7,316,003 B1 | 1/2008 | Dulepet et al. | |
| 7,328,333 B2 | 2/2008 | Kawano et al. | |
| 7,370,322 B1 | 5/2008 | Matena et al. | |
| 7,394,473 B2 | 7/2008 | Asai | |
| 7,401,324 B1 | 7/2008 | Dmitriev | |
| 7,478,341 B2 | 1/2009 | Dove | |
| 7,487,534 B1 | 2/2009 | Peterka et al. | |
| 7,546,602 B2 | 6/2009 | Hejlsberg et al. | |
| 7,552,450 B1 | 6/2009 | Evans et al. | |
| 7,698,606 B2* | 4/2010 | Ladd | G06F 11/2268 |
| | | | 714/48 |
| 7,814,544 B1 | 10/2010 | Wilhelm | |
| 7,945,902 B1 | 5/2011 | Sahoo | |
| 8,024,607 B2* | 9/2011 | Ladd | G06F 11/2268 |
| | | | 714/25 |
| 8,042,113 B2* | 10/2011 | Clohessy | G06F 9/5016 |
| | | | 709/226 |
| 8,046,636 B2* | 10/2011 | Ladd | G06F 11/2268 |
| | | | 714/25 |
| 8,302,111 B2 | 10/2012 | Ladd et al. | |
| 8,321,723 B2* | 11/2012 | Ladd | G06F 11/2268 |
| | | | 714/48 |
| 8,799,723 B2* | 8/2014 | Ladd | G06F 11/2268 |
| | | | 714/48 |
| 2001/0007138 A1 | 7/2001 | Iida et al. | |
| 2001/0049691 A1 | 12/2001 | Asazu | |
| 2002/0009149 A1 | 1/2002 | Rodriguez et al. | |
| 2002/0032754 A1 | 3/2002 | Logston et al. | |
| 2002/0034193 A1 | 3/2002 | Patki et al. | |
| 2002/0038358 A1 | 3/2002 | Sweatt et al. | |
| 2002/0040470 A1 | 4/2002 | Guthrie et al. | |
| 2002/0044567 A1 | 4/2002 | Voit et al. | |
| 2002/0044569 A1 | 4/2002 | Kwok et al. | |
| 2002/0049978 A1 | 4/2002 | Rodriguez et al. | |
| 2002/0052977 A1 | 5/2002 | Stall | |
| 2002/0073244 A1 | 6/2002 | Davies et al. | |
| 2002/0083214 A1 | 6/2002 | Heisig et al. | |
| 2002/0112090 A1 | 8/2002 | Bennett et al. | |
| 2002/0126144 A1 | 9/2002 | Chenede | |
| 2002/0144193 A1 | 10/2002 | Hicks et al. | |
| 2002/0170033 A1 | 11/2002 | Chen | |
| 2002/0174433 A1 | 11/2002 | Baumgartner et al. | |
| 2002/0191028 A1 | 12/2002 | Senechalle et al. | |
| 2002/0198868 A1 | 12/2002 | Kinzhalin et al. | |
| 2003/0005454 A1 | 1/2003 | Rodriguez et al. | |
| 2003/0009765 A1 | 1/2003 | Linden et al. | |
| 2003/0009769 A1 | 1/2003 | Hensgen et al. | |
| 2003/0037331 A1 | 2/2003 | Lee | |
| 2003/0041291 A1 | 2/2003 | Hashem et al. | |
| 2003/0056155 A1 | 3/2003 | Austen et al. | |
| 2003/0056217 A1 | 3/2003 | Brooks | |
| 2003/0061240 A1 | 3/2003 | McCann et al. | |
| 2003/0081664 A1 | 5/2003 | Lu et al. | |
| 2003/0105995 A1 | 6/2003 | Schroath et al. | |
| 2003/0107604 A1 | 6/2003 | Ording | |
| 2003/0110331 A1 | 6/2003 | Kawano et al. | |
| 2003/0110511 A1 | 6/2003 | Schutte et al. | |
| 2003/0121055 A1 | 6/2003 | Kaminski et al. | |
| 2003/0122879 A1 | 7/2003 | Inui et al. | |
| 2003/0140285 A1 | 7/2003 | Wilkie | |
| 2003/0163811 A1 | 8/2003 | Luehrs | |
| 2003/0181241 A1 | 9/2003 | Oakes et al. | |
| 2003/0204848 A1 | 10/2003 | Cheng et al. | |
| 2003/0217197 A1 | 11/2003 | Chan et al. | |
| 2003/0217365 A1 | 11/2003 | Caputo | |
| 2003/0229899 A1 | 12/2003 | Thompson et al. | |
| 2003/0229900 A1 | 12/2003 | Reisman | |
| 2003/0231855 A1 | 12/2003 | Gates et al. | |
| 2004/0003400 A1 | 1/2004 | Carney et al. | |
| 2004/0078695 A1* | 4/2004 | Bowers | G06F 11/0781 |
| | | | 714/39 |
| 2004/0083464 A1 | 4/2004 | Cwalina et al. | |
| 2004/0098730 A1 | 5/2004 | Foote et al. | |
| 2004/0103434 A1 | 5/2004 | Ellis | |
| 2004/0107451 A1 | 6/2004 | Khandelwal et al. | |
| 2004/0158829 A1* | 8/2004 | Beresin | G06F 9/445 |
| | | | 717/178 |
| 2004/0186603 A1 | 9/2004 | Sanford et al. | |
| 2004/0187152 A1 | 9/2004 | Francis et al. | |
| 2004/0199903 A1 | 10/2004 | Iizuka | |
| 2004/0205339 A1 | 10/2004 | Medin | |
| 2004/0218736 A1 | 11/2004 | Fang et al. | |
| 2004/0236759 A1 | 11/2004 | Young | |
| 2004/0261092 A1 | 12/2004 | Addington et al. | |
| 2004/0261114 A1 | 12/2004 | Addington et al. | |
| 2004/0261116 A1 | 12/2004 | McKeown et al. | |
| 2004/0261126 A1 | 12/2004 | Addington et al. | |
| 2005/0015799 A1 | 1/2005 | Park | |
| 2005/0021766 A1 | 1/2005 | McKeowen et al. | |
| 2005/0027851 A1 | 2/2005 | McKeown et al. | |
| 2005/0071818 A1 | 3/2005 | Reissman et al. | |
| 2005/0114900 A1 | 5/2005 | Ladd et al. | |
| 2005/0120385 A1* | 6/2005 | Stalker | G06F 9/44594 |
| | | | 725/134 |
| 2005/0132346 A1 | 6/2005 | Tsantilis | |
| 2005/0160045 A1 | 7/2005 | Watanabe et al. | |
| 2005/0177832 A1* | 8/2005 | Chew | G06F 9/44594 |
| | | | 718/104 |
| 2005/0273762 A1 | 12/2005 | Lesh | |
| 2006/0005183 A1* | 1/2006 | Minear | G06F 8/62 |
| | | | 717/176 |
| 2006/0020950 A1 | 1/2006 | Ladd et al. | |
| 2006/0036750 A1 | 2/2006 | Ladd et al. | |
| 2006/0047957 A1 | 3/2006 | Helms et al. | |
| 2006/0070051 A1 | 3/2006 | Kuck et al. | |
| 2006/0129947 A1 | 6/2006 | Hamzy et al. | |
| 2006/0130107 A1 | 6/2006 | Gonder et al. | |
| 2006/0130113 A1 | 6/2006 | Carlucci et al. | |
| 2006/0143492 A1 | 6/2006 | LeDuc et al. | |
| 2007/0094345 A1* | 4/2007 | Rabbers | G06F 17/30147 |
| | | | 709/217 |
| 2007/0217436 A1 | 9/2007 | Markley et al. | |
| 2007/0261090 A1 | 11/2007 | Miller et al. | |
| 2007/0288897 A1 | 12/2007 | Branda et al. | |
| 2007/0294673 A1 | 12/2007 | Guerrera et al. | |
| 2008/0098212 A1 | 4/2008 | Helms et al. | |
| 2008/0178153 A1 | 7/2008 | Fox et al. | |
| 2008/0196011 A1 | 8/2008 | Bhandari et al. | |
| 2008/0256510 A1 | 10/2008 | Auerbach | |
| 2008/0288930 A1 | 11/2008 | Chen et al. | |
| 2009/0222867 A1 | 9/2009 | Munetsugu | |
| 2013/0247027 A1 | 9/2013 | Shah et al. | |

OTHER PUBLICATIONS

Allen at al. The case for Run-Time Types in Generic Java Rice University 2002 pp. 1-6.

Chou at al. Open CPE Architecture: A Solution to the Delivery of Integrated Services over Broadband, Intel Communication Group, Corp. pp. 1-10, 2001.

Eldering, Charles, Customer Permises Epuipment Residential Broadband Networks, Jun. 1997, IEEE, p. 114-212.

Hentschel et al., Video Quality of Service for Consumer Terminal a Novel System for Programmable Componets, 2002, IEEE, pp. 28-29.

Kar et al., Cable's Home Digital Network Interface of Choice, 1999, Cable Television Lab. IEEE, pp. 34-35.

Motorola—DCT2000 Digital Consumer Terminal Installation Manual; 70 pgs.

Motorola—DCT5100 Digital Consumer Terminal Installation Manual; 81 pgs.

OpenCable Application Platform Specification (© 2001-2003 pp. 1-398).

OpenCable.TM. Host Device Core Functional Requirements Issued Specification (OC-SP-HOST-CFR-I14-030905), Sep. 5, 2003, 81 pages.

(56) References Cited

OTHER PUBLICATIONS

Scientific Atlanta Company Overview web pages, 3 pages, no date http://www.scientificatlanta.com/newscentediframe.sub.--companyoverview.- htm.
Scientific Atlanta—Subscriber Networks; Explorer.RTM. 3100HD High Definition DHCT information pages; Oct. 2001; 2 pgs.
Scientific Atlanta—Subscriber Networks; Explorer.RTM. 4200 Home Gateway information pages; Sep. 2003; 3 pgs.
Scientific Atlanta—Subscriber Products; Explorer.RTM. 8000.TM. Home Entertainment Server information pages; Nov. 2003; 4 pgs.
Ellis, "Getting to Know the OpenCable Application Platform," Sun microsystems, Jun. 2006.
Evain J-P: "The Multimedia Home Platform" EBU Review—Technical, European Broadcasting Union. Brussels, BE, No. 275, Mar. 21, 1998, pp. 4-10, XP000767493.
"Java Media Framework Player API", Apr. 1997, XP-002093309.
"JMF Registry User's Guide", Sun Microsystems, XP-002573305, Feb. 2, 2001.
Mayer, "Analyzing the Use of Interfaces in Large OO Projects," ACM, Oct. 2003.
Motorola—Control Management Module (CMM 2000) information sheets: 4 pages; C Motorola, Inc. 2001; www.motorola.comfbroadband.
Motorola—13 HFC Manager—Integrated Element Management System—"Motorola's HFC Manager provides complete FCAPS functionality for headend and outside plant equipment" information sheets; 4 pages; .Copyrgt. Motorola, Inc. 2003;www.motorola.com/broadband.
Motorola • HFC Manager 'HFC Element Management System information sheet; 1 page: © Motorola, Inc. 2004; www.motorola.com/lbroadband.
Scientific Atlanta: Rosa Network Management System and Element Management web pages, 10 pages, © Scientific Atlanta 2006, www.scientiicatlanta.com.
Scientific Atlanta: "Take Control and Thrive"—Recognize, Trouble-Shoot, Correct information sheet; 1 page; no date; www.scientificatlanta.com.
Sun Micro Systems, Inc. Silicon Graphics Inc. Intel Corporation: "Java Media Players, Version 1.0.5", May 11, 1998, X940410443.
The Use of Dynamically Reconfigurable Protocol Stacks for Streaming Multimedia to Mobile Devices by Curran, et al. (2002-IEEE).
Xie et al., "MAPO: Mining API Usages from Open Source Repositories," ACM, May 2006.
Chapter 16—Window Management. Xlib Programming Manual, No Date. 38 pages.
Chapter 4—Window Manager for Mac ©. Apple Computer. Inc., Jul. 11, 1996, 4 pages.
Chapter 7—Window Management, SOL library Documentation vU.3-rev 1, Sep. 2001, 2 pages.
"Display Space Usage and Window Management Operation Comparison between Single Monitor and Multiple Monitor Users" by D.R. Hutchings, et al., nodate. 8 pages.
MainWin and Window Managers for Mainsoft © article by Jose Luu. Sep. 27, 2000, 5 pages.
New Operation for Display Space Management and Window Management Technical Report GIT-GVU-02-18, Aug. 2002, by D.R. Hutchings and J. Stasko, College of Computing/GVU Center. 20 pages.
OCAP applications in detail (2002; pp. 1-8).
Richard Han et al. copyright 2000.
WinCuts: Manipulating Arbitrary Window Regions for More Effective Use of Screen Space • by D.S. Tan. et al., Microsoft Research. No Date. 4 pages.

\* cited by examiner

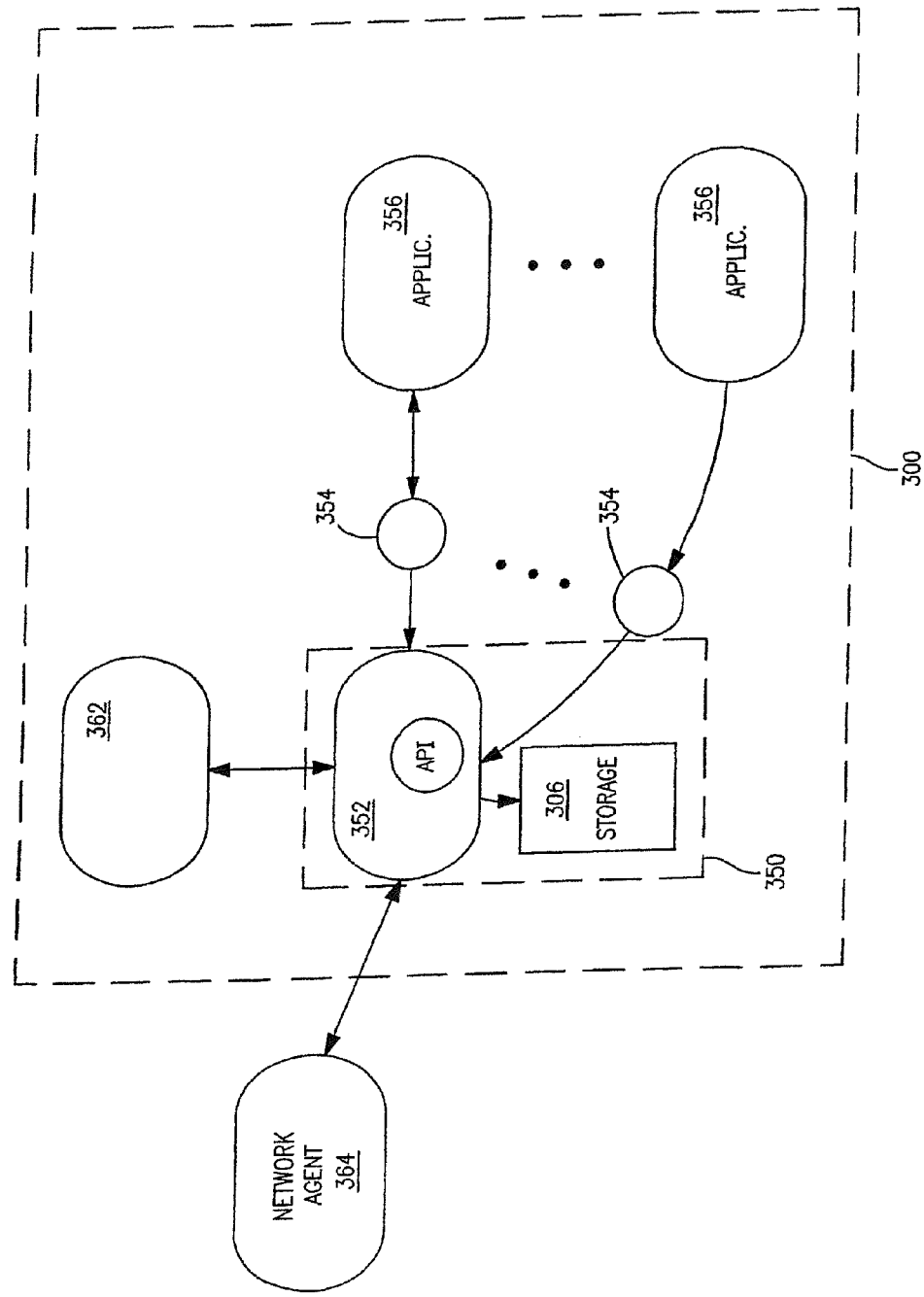

METHODS AND APPARATUS FOR EVENT LOGGING IN AN INFORMATION NETWORK

PRIORITY AND RELATED APPLICATIONS

This application is a continuation of and claims priority to co-owned and co-pending U.S. patent application Ser. No. 13/685,499 of the same title filed Nov. 26, 2012 (issuing as U.S. Pat. No. 8,799,723 on Aug. 5, 2014), which is a continuation of and claims priority to U.S. patent application Ser. No. 13/236,487 of the same title filed Sep. 19, 2011 (now issued as U.S. Pat. No. 8,321,723 on Nov. 27, 2012), which is a continuation of and claims priority to co-owned U.S. Pat. No. 8,046,636 of the same title and issued on Oct. 25, 2011, which is a continuation of and claims priority to co-owned U.S. Pat. No. 7,698,606 of the same title and issued on Apr. 13, 2010, which is a divisional of and claims priority to co-owned U.S. Pat. No. 7,266,726 of the same title and issued on Sep. 4, 2007, each of the foregoing being incorporated herein by reference in its entirety. This application is also related to co-owned U.S. Pat. No. 8,024,607 of the same title and issued on Sep. 20, 2011, which also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of software applications used on an information network (such as a cable television network), and specifically to the logging, analysis, and control of events occurring on electronic devices used in the network during operation of the software.

2. Description of Related Technology

Software applications are well known in the prior art. Such applications may run on literally any type of electronic device, and may be distributed across two or more locations or devices connected by a network. Often, a so-called "client/server" architecture is employed, where one or more portions of applications disposed on client or consumer premises devices (e.g., PCs, PDAs, digital set-top boxes {DSTBs}, hand-held computers, etc.) are operatively coupled and in communication with other (server) portions of the application. Such is the case in the typical hybrid fiber coax (HFC) or satellite content network, wherein consumer premises equipment or CPE (e.g., DSTBs or satellite receivers) utilize the aforementioned "client" portions of applications to communicate with their parent server portions in order to provide downstream and upstream communications and data/content transfer.

Digital TV (DTV) is an emerging technology which utilizes digitized and compressed data formats (e.g., MPEG) for content transmission, as compared to earlier analog "uncompressed" approaches (e.g., NTSC). The DTV content may be distributed across any number of different types of bearer media or networks with sufficient bandwidth, including HFC, satellite, wireless, or terrestrial. DTV standards such as the OpenCable Application Platform middleware specification (e.g., Version 1.0, and incipient Version 2.0) require that applications be downloaded to CPE from the bearer or broadcast network in real-time. The OCAP specification is a middleware software layer specification intended to enable the developers of interactive television services and applications to design such products so that they will run successfully on any cable television system in North America, independent of set-top or television receiver hardware or operating system software choices.

Due to the broad variety of applications which can be downloaded over cable networks, and the broad variety of different CPE hardware and middleware that can receive such applications, application run-time and other software errors are somewhat inevitable. These errors can result in both significant frustration for the consumer, and the generation of many unnecessary service calls from the cable systems operator or other service provider. These deficiencies stem largely from the inability of existing cable/CPE devices to (i) log, analyze, and recover from fairly routine or non-critical errors; and (ii) communicate with the cable systems operator. Specifically, a network provider must be able to process events occurring within the CPE connected to their networks, including identifying (and ideally diagnosing and correcting) any errors. This CPE may include both leased equipment and retail consumer electronic equipment, and hence any corrective system must be adapted to interface with a variety of different equipment.

One type of error or event which can occur in cable network CPE is what is generally referred to as "resource exhaustion". This term is applied to a group of different circumstances wherein one or more resources within the CPE (such as memory, CPU capacity, etc.) are at or near exhaustion, thereby indicating an incipient or prospective error condition within an application. As is well known, when resources such as memory become exhausted within an OCAP compliant Host device (e.g., set-top box, integrated TV), the application manager within the OCAP system will begin destroying applications starting with the lowest priority application. Hence, the OCAP-compliant CPE employs a priority-based system of resource self-preservation. However, such systems are generally not capable of (uniquely) dealing with different types of resource exhaustion, logging data relating to the exhaustion event(s), or initiating corrective action for other types of events occurring within the CPE (such as thrown but uncaught Java exceptions), or reboot events which are not initiated by the middleware. Accordingly, the OCAP-complaint prior art CPE is generally not as robust as it could be, and does not afford the level of control over the CPE operations during error conditions that is desired by cable network operators.

A variety of other approaches to error logging and handling within computer systems are taught in the prior art. These approaches generally range from bit-level systems such as those used in semiconductor applications, to higher-level functional or behavior logging systems for networked computers. For example, U.S. Pat. No. 3,999,051 to Petschauer issued Dec. 21, 1976 and entitled "Error logging in semiconductor storage units" discloses a maintenance procedure comprising a method of and an apparatus for storing information identifying the location of one or more defective bits, i.e., a defective memory element, a defective storage device or a failure, in a single-error-correcting semiconductor main storage unit (MSU) comprised of a plurality of large scale integrated (LSI) bit planes. The method utilizes an error logging store (ELS) comprised of 128 word-group-associated memory registers. A defective device counter (DDC) counts the set tag bits in the ELS and is utilized by the machine operator to schedule preventative maintenance of the MSU by replacing the defective bit planes. By statistically determining the number of allowable failures, i.e., the number of correctable failures that may occur before the expected occurrence of a noncorrectable double bit error, preventative maintenance may be scheduled only as required by the particular MSU.

U.S. Pat. No. 4,339,657 to Larson, et al. issued Jul. 13, 1982 and entitled "Error logging for automatic apparatus" discloses methods and apparatus for error logging by integrating errors over a given number of operations that provides long memory and fast recovery. Errors integrated over a selected number of associated operations are compared to a criterion. An exception is logged each time the number of errors is not less than the criterion but if the number of errors is less than the criterion, the exception log is cleared.

U.S. Pat. No. 4,604,751 to Aichelmann, Jr., et al. issued Aug. 5, 1986 and entitled "Error logging memory system for avoiding miscorrection of triple errors" discloses apparatus by which miscorrection of triple errors is avoided in a memory system by providing a double bit error logging technique. The address of each fetched word is logged in which a double bit error is detected. The address of each fetched word in which a single bit error is detected is compared with all logged addresses. If a coincidence is found between the compared addresses, a triple bit error alerting signal is generated and error recovery procedures are initiated.

U.S. Pat. No. 5,121,475 to Child, et al. issued Jun. 9, 1992 and entitled "Methods of dynamically generating user messages utilizing error log data with a computer system" discloses methods of error logging and correction in a communications software system. An error log request is generated by a component of the system; the error log request is analyzed and compared to entries in one of a plurality of records in a message look-up table. If there is a match between the fields of the error log request and selected entries of a record in the look-up table, a user message request is generated which facilitates the display of a pre-existing user friendly message as modified with data included in the generated user message request.

U.S. Pat. No. 5,155,731 to Yamaguchi issued Oct. 13, 1992 and entitled "Error logging data storing system" discloses an error logging data storing system containing a first storing unit for storing error logging data corresponding to an error of high importance, a second storing unit for storing error logging data corresponding to an error of either high or low importance. A first indicating unit indicates whether or not the first storing unit is occupied by error logging data the diagnosing operation of which is not completed. A second indicating unit indicates whether or not the second storing unit is occupied by error logging data the diagnosing operation of which is not completed. A storage control unit stores error logging data corresponding to an error of high importance in the second storing unit when the first indicating unit indicates that the first storing unit is occupied by error logging data the diagnosing operation of which is not completed and the second indicating unit indicates that the second storing unit is not occupied by error logging data the diagnosing operation of which is not completed.

U.S. Pat. No. 5,245,615 to Treu issued Sep. 14, 1993 and entitled "Diagnostic system and interface for a personal computer" discloses a personal computer having a NVRAM comprising an error log for storing predetermined error log information at predetermined locations therein. The information is accessible by various programs such as a POST program, a diagnostics program, and an operating system program. Access is made by BIOS interrupt calls through a BIOS interface. The NVRAM also stores vital product data and system setup data.

U.S. Pat. No. 5,463,768 to Cuddihy, et al. issued Oct. 31, 1995 and entitled "Method and system for analyzing error logs for diagnostics" discloses an error log analysis system comprising a diagnostic unit and a training unit. The training unit includes a plurality of historical error logs generated during abnormal operation or failure from a plurality of machines, and the actual fixes (repair solutions) associated with the abnormal events or failures. A block finding unit identifies sections of each error log that are in common with sections of other historical error logs. The common sections are then labeled as blocks. Each block is then weighted with a numerical value that is indicative of its value in diagnosing a fault. In the diagnostic unit, new error logs associated with a device failure or abnormal operation are received and compared against the blocks of the historical error logs stored in the training unit. If the new error log is found to contain block(s) similar to the blocks contained in the logs in the training unit, then a similarity index is determined by a similarity index unit, and solution(s) is proposed to solve the new problem. After a solution is verified, the new case is stored in the training unit and used for comparison against future new cases.

U.S. Pat. No. 5,790,779 to Ben-Natan, et al. issued Aug. 4, 1998 and entitled "Method and system for consolidating related error reports in a computer system" discloses a method and system for consolidating related error reports. In a preferred embodiment, a facility preferably implemented in software ("the facility") receives error reports and success reports generated by programs. When the facility receives a novel error report specifying an error source for which no error state is set, it sets an error state corresponding to the error report. The facility also preferably generates a consolidated error report at this point, which is delivered to a error state reporting subsystem. The error state reporting subsystem may add the consolidated error report to an error log and/or display it to a user. When the facility receives a redundant error report specifying an error source for which an error state is already set, the facility preferably does not set a new error state, nor does it generate a consolidated error report. When the facility receives a success report specifying an error source, it clears any error states that are set for the specified error source, and preferably generates a consolidated success report. The performance of the facility is preferably optimized by processing success reports asynchronously.

U.S. Pat. No. 5,862,316 to Hagersten, et al. issued Jan. 19, 1999 and entitled "Multiprocessing system having coherency-related error logging capabilities" discloses protocol agents involved in the performance of global coherency activity that detect errors with respect to the activity being performed. The errors are logged by a computer system such that diagnostic software may be executed to determine the error detected and to trace the error to the erring software or hardware. In particular, information regarding the first error to be detected is logged. Subsequent errors may receive more or less logging depending upon programmable configuration values. Additionally, those errors which receive full logging may be programmably selected via error masks. The protocol agents each comprise multiple independent state machines which independently process requests. If the request which a particular state machine is processing results in an error, the particular state machine may enter a freeze state. Information regarding the request which is collected by the state machine may thereby be saved for later access. A state machine freezes upon detection of the error if a maximum number of the multiple state machines are not already frozen and the aforementioned error mask indicates that full error logging is employed for the detected error. Therefore, at least a minimum number of the multiple state machines remain functioning even in the presence of a large number of errors. Still further, prior to entering the freeze state, the protocol state machines may transition through a recovery state in which resources not used for error logging purposes are freed from the erring request.

U.S. Pat. No. 6,381,710 to Kim issued Apr. 30, 2002 and entitled "Error logging method utilizing temporary defect list" discloses an error logging method utilizing a temporary defect list to store errors produced at or above a predetermined occurrence frequency during a defect detecting test. The method includes the steps of: determining whether an error is recorded on a temporary defect list, determining whether the error is recorded on an error frequency list when the error is not recorded on the temporary defect list, adding the error to the error frequency list if the error is not recorded on the error frequency list, increasing the occurrence frequency of the error if the error is on the error frequency list, and adding the error to the temporary defect list if the error has an occurrence frequency greater than or equal to a threshold value established as a standard for classifying an error as a defect. The temporary defect list can be used as a final error list, and thereby reduce memory requirements.

U.S. Pat. No. 6,532,552 to Benignus, et al. issued Mar. 11, 2003 and entitled "Method and system for performing problem determination procedures in hierarchically organized computer systems" discloses a method and system for performing problem determination procedures in a hierarchically organized computer system. The hardware components of the data processing system are interconnected in a manner in which the components are organized in a logical hierarchy. A hardware-related error occurs, and the error is logged into an error log file. At some point in time, a diagnostics process is initiated in response to the detection of the error. The logged error may implicate a particular hardware component, and the hardware component of the data processing system is analyzed using a problem determination procedure. In response to a determination that the hardware component does not have a problem, the logically hierarchical parent hardware component of the hardware component is selected for analysis. The logically hierarchical parent hardware component is then analyzed using a problem determination procedure. The method continues to analyze the logically hierarchical parent components until the root component is reached or until a faulty component is found.

U.S. Pat. No. 6,505,298 to Cerbini, et al. issued Jan. 7, 2003 and entitled "System using an OS inaccessible interrupt handler to reset the OS when a device driver failed to set a register bit indicating OS hang condition" discloses a method and system for providing a reset after an operating system (OS) hang condition in a computer system, the computer system including an interrupt handler not accessible by the OS. The method includes determining if an interrupt has been generated by a watchdog timer; monitoring for an OS hang condition by the interrupt handler if the interrupt has been generated and after it is known that the OS is operating; and resetting the OS if a device driver within the OS has not set a bit in a register, the bit for indicating that the OS is operating. The method and system in accordance with the present invention uses existing hardware and software within a computer system to reset the OS. The invention uses a method by which a critical hardware watchdog periodically wakes a critical interrupt handler of the computer system. The critical interrupt handler determines if the OS is in a hang condition by polling a share hardware register that a device driver, running under the OS, will set periodically. If the critical interrupt handler does not see that the device driver has set the register bit, it will assume the OS has hung and will reset the system. In addition, the critical interrupt handler will store the reset in non-volatile memory. The reset can be logged into the system error log. Because the method and system in accordance with the invention uses existing hardware and software within the computer system, instead of requiring an additional processor, it is ostensibly cost efficient to implement while also providing a reset of the OS without human intervention.

United States Patent Publication No. 20010007138 to Iida, et al. published Jul. 5, 2001 and entitled "Method and system for remote management of processor, and method and system for remote diagnosis of image output apparatus" discloses a method and system for remote management of processors and a method and system for remote diagnosis of processors such as image output apparatus. Operation information about contents of operation performed by a processor during an operational preset period or a preset number of executions of processing is recorded. An operation log is formed by combining the operation information and is transferred to a remote management apparatus connected to the processor by a communication line. The remote management apparatus performs remote management of the condition of the processor on the basis of the transmitted operation log. An error log containing information about occurrences of errors having occurred in the processor is also formed and transferred to the remote management apparatus.

United States Patent Publication No. 20020083214 to Heisig, et al. published Jun. 27, 2002 and entitled "Protocol adapter framework for integrating non-HOP applications into an object server container" discloses a method and apparatus for providing access to objects and methods via arbitrary remote protocols in a computer with object server. This includes a mechanism known as the protocol adapter framework that allows protocol adapters to manage remote socket sessions, encrypt communication on this session, translate text to the local character set, perform security validation of the remote user, log incoming work requests, classify the incoming work request for differentiated service purposes, and queue the work for execution. Also, included is a mechanism to invoke the protocol adapter in order to manipulate output from the execution of a method on a server object and send it back to the original requester. This allows the implementers of objects and methods that reside in the object server rather than the owner of the object server to provide a protocol adapter that allows communication with remote clients using any arbitrary protocol that the object implementer deems appropriate. In this way, the object implementer can enjoy benefits such as differentiated service, workload recording, server object process management, process isolation, error logging, systems management and transactional services of running objects in a robust object server container.

United States Patent Application Publication No. 20020144193 to Hicks, et al. published Oct. 3, 2002 and entitled "Method and system for fault isolation methodology for I/O unrecoverable, uncorrectable error" discloses a method and system for managing uncorrectable data error conditions from an I/O subsystem as the UE passes through a plurality of devices in a central electronic complex (CEC). The method and system comprises detecting a I/O UE by at least one device in the CEC; and providing an SUE-RE (Special Uncorrectable Data Error-Recoverable Error) attention signal by at least one device to a diagnostic system that indicates the I/O UE condition. The method and system further includes analyzing the SUE-RE attention signal by the diagnostic system to produce an error log with a list of failing parts and a record of the log. The invention provides a fault isolation methodology and algorithm, which allows for the determination of an error source and provides appropriate service action if and when the system fails to recover from the UE condition.

United States Patent Application Publication No. 20030041291 to Hashem, et al. published Feb. 27, 2003 and entitled "Method and system for tracking errors" discloses a system and method for tracking errors, the system residing on a user's desktop communicating with a central database over a network. The system comprises an error log including error recording tools for enabling the user to record an error; error resolution tools for enabling the user to resolve the error; and error follow-up tools for enabling a user to follow up on resolved errors; error reporting tools for enabling a user to generate error reports from the user's desktop; and communication tools for enabling the user to transmit logged errors to the central database and to receive reports generate from errors logged in the central database.

United States Patent Application Publication No. 20030056155 to Austen, et al. published Mar. 20, 2003 and entitled "Method and apparatus for filtering error logs in a logically partitioned data processing system" discloses a method, apparatus, and computer implemented instructions for reporting errors to a plurality of partitions. Responsive to detecting an error log, an error type for the error log is identified. If the error log is identified as a regional error log, an identification of each partition to receive the error log is made. Then, the error log is reported to each partition that has been identified to receive the error log.

United States Patent Application Publication No. 20030105995 to Schroath, et al. published Jun. 5, 2003 and entitled "Method and apparatus for rebooting a printer" discloses detection and logging of printer errors in an error log. If the same printer error has occurred within a predetermined time period, an error message is generated on the printer's control panel and a network administrator is notified of the printer errors. If the same printer error has not occurred within the predetermined time period, the printer is rebooted. If the same printer error has occurred a predetermined number of consecutive times, an error message is generated on the printer's control panel and a network administrator is notified of the printer errors. If the same printer error has not occurred a predetermined number of times, the printer is rebooted.

United States Patent Application Publication No. 20030140285 to Wilkie published Jul. 24, 2003 and entitled "Processor internal error handling in an SMP server" discloses a system and method for handling processor internal errors in a data processing system. The data processing system typically includes a set of main microprocessors that have access to a common system memory via a system bus. The system may further include a service processor that is connected to at least one of the main processors. In addition, the system includes internal error handling hardware configured to log and process internal errors generated by one or more of the main processors. The internal error hardware may include error detection logic configured to receive internal error signals from the main processors. By incorporating error logging and handling into dedicated hardware tied directly to the processor internal error signals, the invention ostensibly provides a lower cost, lower response latency mechanism for handling processor internal errors in high performance multiprocessor systems.

The well known Windows® NT operating system manufactured by Microsoft Corporation includes an error logging capability ("Event Viewer") that may be used on, e.g., data networks including servers. The Event Viewer is a tool used to examine the three NT event logs: System, Security, and Application.

Each message within the Windows NT error logger has an event ID number. The maximum size of logs can be set, and overriding of log entries can be set depending on available disk space. System errors include: (i) Information—a significant event has occurred, but the event is not critical; (ii) Warning—this is a caution indication of a possible significant event which may or may not affect future operations; and (iii) Error—indicates a problem that has caused a failure of service.

Security Log errors include: (i) Success Audit—a successful audited security event has occurred; and (ii) Failure Audit—a failed audited security event has occurred.

The exemplary Windows NT Event viewer display includes information relating to the date, time, source, category, Event ID number, user, and computer to which a given error is related.

The Windows NT system uses a registry to locate files (.EXE or .DLL) that contain resource strings. RegisterEventSource and ReportEvent functions are provided to log messages to the event log service. The name specified as a parameter to RegisterEventSource must match the name of the key in the registry. With Windows NT, each system maintains its own log files; there is no central storage location.

Similarly, other third party products such as the EventReporter product sold by Adiscon GMbH monitors Windows NT/2000/XP/Server 2003 event logs and reports via syslog or email. Automated monitoring is provided to assist in early detection of problems on the network. For applications with a larger number of servers, a centralized log is maintained via syslog servers available for Windows, Unix, Linux and other operating systems. See also the "Snare" freeware product, which collects and processes Windows NT Event Log information from multiple event logs, and converts the information to tab or comma delimited text format and delivers it via UDP to a remote server.

A recently proposed Home Audio Video Interoperability (HAVi) specification is a consumer electronics (CE) industry standard design to permit digital audio and video devices that conform to this standard, regardless of manufacturer, to interoperate when connected via a network in the consumer's home. The HAVi standard (e.g., Version 1.1) uses the digital IEEE-1394 network standard for data transfer between devices and the 1394 A/VC protocols for device control.

The HAVi standard focuses on the transfer and processing (for example, recording and playback) of digital content between networked devices. HAVi-compliant devices will include not only familiar audio and video components but also cable modems, digital set-top boxes and "smart" storage devices such as personal video recorders (PVRs).

By employing modular software, the HAVi standard allows consumer electronics devices to identify themselves and what they can do when plugged into the host. The software functions by assigning a device control ID module to each hardware component of a system. Each system also is assigned multiple functional component modules, containing information about an individual device's capabilities, for example, whether a camcorder operates in DV format, or whether a receiver is designed to process AC3 audio.

All HAVi APIs involving messaging (e.g., those APIs where the Communication Type is "M" or "MB") use a "status" structure consisting of two fields: an API code and an error code. Generally the different software elements will define their own error codes (see Annex 11.7 of HAVi Version 1.1). Additionally, there are several "general purpose" error codes that can be used by any software element. These general error codes are: (i) SUCCESS—the operation has succeeded (this is the normal return value in Status and not an error); (ii) EUNKNOWN_MESSAGE—the receiver of a HAVi message does not support the API indicated by the Operation Code contained within the message; (iii) EACCESS_VIOLATION—the caller of an API does not have permission to perform the operation; (iv) EUNIDENTIFIED_FAILURE—an error of unknown origin has occurred; (v) ERESERVED—the operation is refused because the FCM (or, in the case of a DCM, one of the FCMs involved in the DCM operation) is reserved by another software element and the invoking software element (possibly a secondary client) is not allowed to perform this operation; (vi) ENOT_IMPLEMENTED—the receiver of a HAVi message does not implement the optional API indicated by the Operation Code contained within the message; (vii) EINVALID_PARAMETER—one or more parameters in a HAVi message contain invalid values; (viii) ERESOURCE_LIMIT—the operation failed due to resource limitations at the destination device EPARAMETER_SIZE_LIMIT—one or more parameters in a HAVi message exceed their safe; (ix) parameter size limit and the receiver is unable to handle the parameter(s); (x) EINCOMPLETE_MESSAGE—the length of a HAVi message is shorter than the length required for compliant messages (using the Operation Code contained within the message); (xi) EINCOMPLETE_RESULT—one or more out parameters in a HAVi message are correct but incomplete. Note that this may only occur when one or more parameters are at least the safe parameter size; (xii) ELOCAL—the caller of a "local" API (as indicated in the "Services Provided" tables) is not on the same device as the provider of the API; and (xiii) ESTANDBY—the operation is refused because the target device is in standby state.

The error code appearing in the status value returned by a HAVi API is either: one of the general codes listed above, a Messaging System error code, or an API-specific error code (one that is listed in the "Error codes" section following the description of the API). If the Status value returned by a HAVi API contains one of the "general error codes" listed above (including SUCCESS), the API code is that used in invoking the API, otherwise it is the API code associated with the contained error (as identified in Annex 11.7). If the contained error is not listed in the "Error codes" section following the description of the API or the contained error has an invalid API code, the client of the API shall interpret the contained error as EUNIDENTIFIED_FAILURE. Therefore, if the client is a Java client, the corresponding messagesending method of the client class, server helper class (see section 7.3.8.1.2) or the SoftwareElement class throws HaviUnidentifiedFailureException in these cases.

In terms of resource limitations, some of the HAVi APIs have specifications that would allow unbounded sizes for some parameters. However, each FAV and IAV will only have a limited amount of memory. These limitations can differ from controller to controller and thus hamper interoperability between controllers. Therefore, for variable sized (input or output) parameters in HAVi APIs a "safe parameter size limit" is specified. Such limits indicate that compliant software elements will be able to handle messages where the size of the parameter in question is less than or equal to the safe parameter size limit. However, accepting parameters of size larger than the safe parameter size limit is allowed.

The safe parameter size limit puts a requirement to support the indicated parameter size at both sending and receiving sides. At the receiving side (in parameters for servers, out parameters for clients) this means being able to receive and handle. At the sending side (out parameters for servers, in parameters for clients) this means being able to construct and send.

The server may return the EPARAMETER_SIZE_LIMIT error if it cannot handle the request due to the safe parameter size of an in parameter being exceeded.

The server returns the EINCOMPLETE_RESULT error if the parameters it returns are valid but incomplete. Note that a server may only return this error when one or more of the parameters it returns are at least the safe parameter size.

The server returns ERESOURCE_LIMIT if it fails to process a request due to lack of resources. If the server generates an incomplete or potentially incomplete response, i.e., one where values of the out parameters are valid but may be incomplete, this error is not returned.

Despite the foregoing, no suitable methodology or architecture for both logging and responding to errors (such as repetitive boots or uncaught thrown Java exceptions) encountered during operation of networked systems has been disclosed under the prior art. This is particularly true in the context of leased set-top boxes and OpenCable compliant Host devices. Prior art solutions also do not provide the ability to (i) tailor delivery of error and reboot reports to a network agent, and (ii) transfer recovery of exhausted system resources from CPE manufacturer control to network operator control.

Accordingly, there is a need for improved apparatus and methods for providing error logging, diagnosis, operation, and control of applications within such networks. These improved apparatus and methods would meet these needs while also enabling compliance with industry standard requirements within the network.

SUMMARY OF THE INVENTION

The present invention addresses the foregoing needs by disclosing an improved error logging and response apparatus and associated methods.

In a first aspect of the invention, an improved method of operating client equipment in a content-based network is disclosed. The method generally comprises: generating first data relating to the operation of the equipment; receiving, at a first application, the first data; evaluating the first data; and selectively storing at least a portion of said first data within a storage device. In one exemplary embodiment, the client equipment comprises an OCAP-compliant set-top box or similar device having middleware comprising an event logging system registered to receive event notifications form other applications or hardware. The system is also adapted to evaluate the received notifications and classify them according to priority.

In a second aspect of the invention, an improved method of operating CPE having resources within a content-based network is disclosed. In one exemplary embodiment, the CPE includes an event logging system adapted to communicate with another network entity, and a plurality of software applications. The CPE evaluates the resource(s) using the logging system; and in response thereto selectively controls the operation of one or more of the applications, including selective destruction thereof based on depletion of the resources.

In a third aspect of the invention, fault-tolerant CPE adapted for coupling to a cable network is disclosed. The CPE generally comprises a monitor application running thereon and adapted to (i) detect at least one event relating to the operation of one or more software applications running thereon; (ii) selectively log data relating to the event for subsequent use; and (iii) control the operation of the CPE based at least in part on the detected event. In one exemplary embodiment, the monitor application is further adapted to communicate with an external entity such as a network agent. The monitor can both log errors for retrieval by the network agent, and selectively suspend or destroy software applications in order to mitigate resource depletion.

In a fourth aspect of the invention, an improved method of operating a cable network having a plurality of client devices operatively coupled thereto is disclosed, the method generally comprising: distributing at least one software application to each of the plurality of devices; providing at least one monitor entity to each of the devices; monitoring the operation of the software application(s) with respective ones of the monitor applications; detecting events associated with the operation of the software application(s); and responsive to such detecting, logging a plurality of data relating to the events within the devices for subsequent use. In the exemplary embodiment, the network comprises an HFC network with a plurality of DSTBs attached. A trusted monitor application implements the event logging system on the DSTBs, the logging system adapted to both selectively store data regarding various types of events, and provide access to the stored data to another agent on the network The monitor and agent may also institute corrective action for the event as required.

In a fifth aspect of the invention, an improved head-end apparatus for use in a cable network is disclosed. The apparatus generally comprises at least one server having a software process running thereon, the software process being adapted to selectively interface with at least one client device and retrieve logged error data therefrom. In the exemplary configuration, the head-end apparatus is disposed within an HFC network having an SMS, CMTS, and application distribution servers. The software process is adapted to communicate with the client device event logging system via either in-band or OOB channels.

In a sixth aspect of the invention, an improved error logging system adapted for use on a consumer electronics device is disclosed. The system generally comprises: an event registration entity; an event submission entity; an event database; a priority event reporting entity; a network retrieval entity; and a resource depletion registration entity. In one exemplary embodiment, the device comprises a set-top box having OCAP-compliant middleware comprised of at least a portion of the aforementioned functional entities. The entities comprise objects within a Java programming environment and the network retrieval entity comprises a portion of a client-server architecture by which the various entities in the logging system can be accessed and controlled remotely.

In a seventh aspect of the invention, a method of conducting business via a cable network having a plurality of client devices with event logging systems is disclosed. The method generally comprises: distributing a software application to the plurality of devices; running the software application; receiving an event notification via the event logging system; evaluating the notification to determine a corrective action; and selectively controlling a function within the device using the event logging system to implement at least a portion of the corrective action. In one embodiment, the event logging system comprises middleware running on the device, the middleware comprising a plurality of APIs. Selective control is accomplished via one or more of the APIs. The event logging system can also be selectively enabled based on one or more subscription policies in effect on the network for individual subscribers.

In an eighth aspect, an apparatus configured for operation with a content delivery network is disclosed. In one embodiment, the apparatus comprises: a network interface configured to communicate with the content delivery network; a digital processor; a storage device operatively coupled to the processor; middleware configured to run on the processor; a software entity configured to manage a plurality of resources; and a plurality of software applications configured to run on the processor. The apparatus is further configured to, in cooperation with the middleware: identify an event related to insufficient resources during operation of the apparatus; and resolve the event related to insufficient resources via selective termination of one or more of the plurality of software applications by the software entity.

In a ninth aspect, a method of operating consumer premises equipment (CPE) in operative communication with a content delivery network is disclosed. In one embodiment, the method comprises: (i) determining whether sufficient resources are available for utilization by a plurality of software applications currently running on the CPE; (ii) upon a determination of that there are insufficient resources, selectively terminating one or more of the software applications; and (iii) generating data related to the determination of insufficient resources and the termination.

In a tenth aspect, an apparatus configured for operation within a content distribution network is disclosed. In one embodiment, the apparatus comprises: a digital processor; a storage device operatively coupled to the processor; middleware configured to run on the processor; a software entity configured to manage a plurality of resources; and a plurality of software applications configured to run on the processor. The apparatus is further configured to, in cooperation with the middleware: identify an instance of insufficient resources related to concurrent operation of the plurality of software applications by the software entity; and implement a remedial action comprising a selective termination of one or more of the plurality of software applications in response to the identification of the instance of insufficient resources.

These and other aspects of the invention shall become apparent when considered in light of the disclosure provided below.

BRIEF DESCRIPTION OF THE DRAWINGS

FIG. 3a is a logical block diagram illustrating the relationships between the various components within the CPE, and the error logging system.

DETAILED DESCRIPTION OF THE INVENTION

Figure 1:
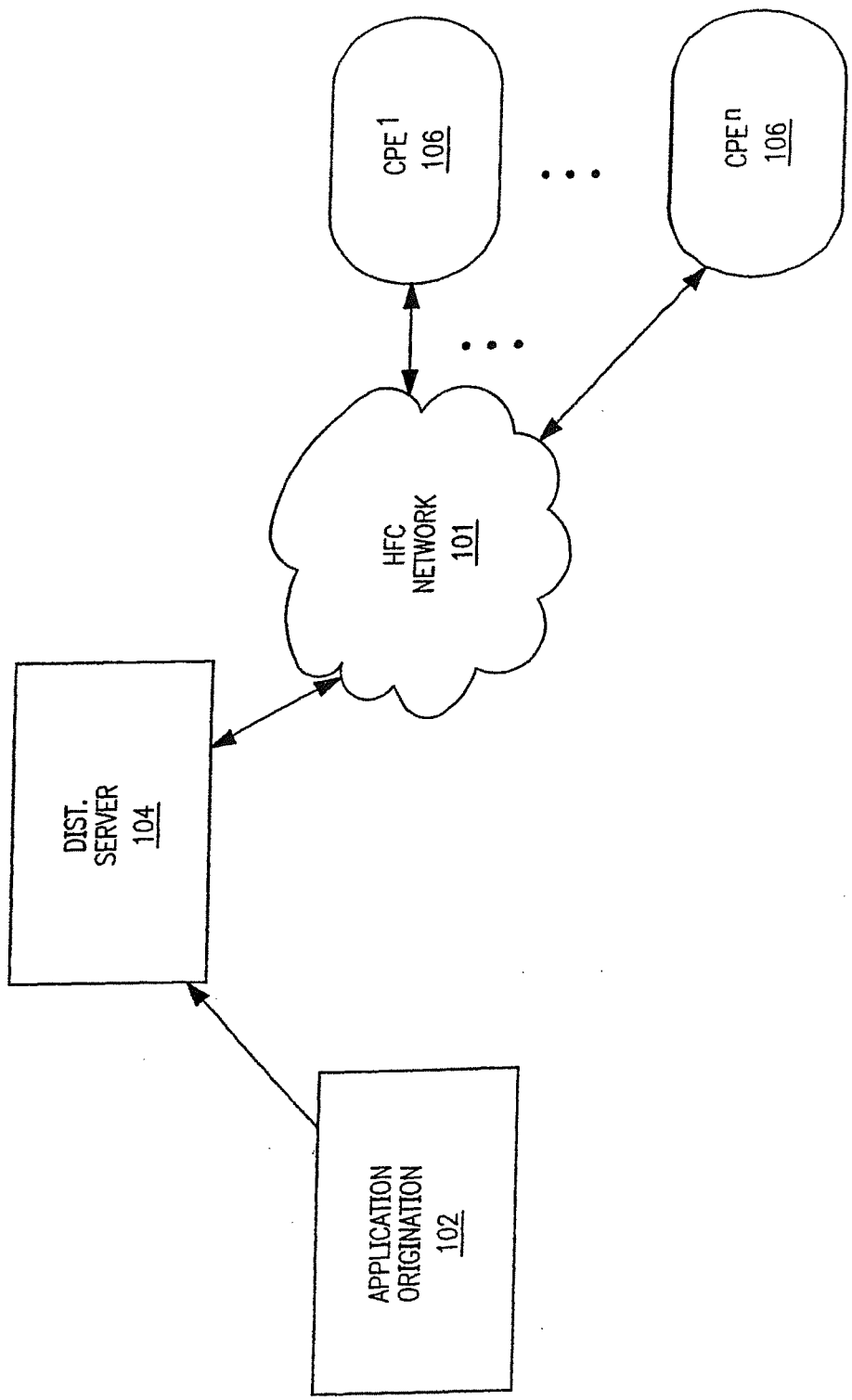
FIG. 1 is a functional block diagram illustrating an exemplary HFC network configuration useful with the present invention.

Reference is now made to the drawings wherein like numerals refer to like parts throughout.

As used herein, the term "application" refers generally to a unit of executable software that implements theme-based functionality The themes of applications vary broadly across any number of disciplines and functions (such as e-commerce transactions, brokerage transactions, mortgage interest calculation, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "middleware" refers to software that generally runs primarily at an intermediate layer in a software or protocol stack. For example, middleware may run on top of an operating system and platform hardware, and below applications.

The term "component" refers generally to a unit or portion of executable software that is based on a related set of functionalities. For example, a component could be a single class in Java™ or C++. Similarly, the term "module" refers generally to a loosely coupled yet functionally related set of components.

As used herein, the term "process" refers to executable software that runs within its own CPU environment. This means that the process is scheduled to run based on a time schedule or system event. It will have its own Process Control Block (PCB) that describes it. The PCB will include items such as the call stack location, code location, scheduling priority, etc. The terms "task" and "process" are typically interchangeable with regard to computer programs.

A server process is an executable software process that serves various resources and information to other processes (clients) that request them. The server may send resources to a client unsolicited if the client has previously registered for them, or as the application author dictates.

As used herein, the term "DTV Network Provider" refers to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "head-end" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/8XXX series digital devices, personal digital assistants (PDAs) such as the Apple Newton®, "Palm®" family of devices, handheld computers such as the Hitachi "VisionPlate", personal communicators such as the Motorola Accompli devices, Motorola EVR-8401, J2ME equipped devices, cellular telephones, or literally any other device capable of interchanging data with a network.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

The term "processor" is meant to include any integrated circuit or other electronic device (or collection of devices) capable of performing an operation on at least one instruction including, without limitation, reduced instruction set core (RISC) processors, CISC microprocessors, microcontroller units (MCUs), CISC-based central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Overview

As previously discussed, a network provider such as a cable system operator needs to be able to process events, including identifying (and ideally diagnosing and correcting) any errors that are occurring within consumer premises equipment (CPE) connected to their networks. This CPE may include both leased equipment and retail consumer electronic equipment. Moreover, the ability to communicate with the CPE via the network or other communications channel is useful in handling, and in certain cases obviating, consumer calls and complaints.

The improved event logging and management apparatus and methods described herein provide mechanisms by which the cable system operator or other entity can gain such insight into CPE events and errors (such as those generated by other applications running on the CPE) as well as other operational aspects of the CPE. This substantially enhances the robustness of the CPE and network in general. In an exemplary configuration, an API is provided to trusted downloaded network applications resident on the CPE thereby enabling these applications to discover the error(s), report them to the network operator, and optionally recover from them autonomously or under supervisory control of an external agent. A trusted application such as the monitor application defined by the OCAP 1.0 specification is configured to register with the implementation (a.k.a. middleware) to receive event notifications, such as for example Java exceptions thrown by an application but not caught by the application, and take appropriate action; e.g., reboot in cases where the error was not caused by the monitor application. The error logging system advantageously allows the registered trusted application to store the information received by aforementioned events for retrieval by a network agent where/when convenient for the agent, or where required by another process. In addition, the registered trusted application is optionally programmed by the network operator to generate and deliver one or more error messages or communications of suitable priority. These messages may be of predetermined format/content, or alternatively customized to the particular context of the error experienced by the CPE.

In the context of a typical OCAP-based configuration (e.g., OCAP 1.0), the application manager program within the OCAP system may begin destroying applications, starting with the lowest priority application, when resources (e.g., memory or CPU usage) become exhausted. Exhaustion of system resources may comprise an error (i.e., one type of "event") that is reportable to the registered trusted application. In another aspect of the invention, a second registration is optionally provided that allows a trusted application to selectively determine which applications are destroyed. Thus, a network application decides which applications are destroyed when system resources are exhausted, rather than the application manager as under the prior art. This approach transfers the recovery control of the exhausted system resources from the CPE manufacturer (via the application manager) to the network operator, thereby providing the network operator with enhanced error recovery capabilities.

Detailed Description of Exemplary Embodiments

Exemplary embodiments of the apparatus and methods of the present invention are now described in detail. While these exemplary embodiments are described in the context of the aforementioned hybrid fiber coax (HFC) cable system architecture having a multiple systems operator (MSO), digital networking capability, and plurality of client devices/CPE, the general principles and advantages of the invention may be extended to other types of networks and architectures, whether broadband, narrowband, wired or wireless, or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

FIG. 1 illustrates a typical network component configuration with which the hardware registry apparatus and methods of the present invention may be used. The various components of the network 100 include (i) one or more application origination points 102; (ii) one or more distribution servers 104; and (iii) consumer premises equipment (CPE) 106. The distribution server(s) 104 and CPE(s) 106 are connected via a bearer (e.g., HFC) network 101. A simple architecture comprising one of each of the aforementioned components 102, 104, 106 is shown in FIG. 1 for simplicity, although it will be recognized that comparable architectures with multiple origination points, distribution servers, and/or CPE devices (as well as different network topologies) may be utilized consistent with the invention. For example, the head-end architecture of FIG. 1*a* (described in greater detail below) may be used.

The application origination point 102 comprises any medium that allows an application to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The distribution server 104 comprises a computer system where one or more applications can enter the network system. Distribution servers are well known in the networking arts, and accordingly not described further herein.

The CPE 106 includes any equipment in the "consumers' premises" (or other locations, whether local or remote to the distribution server 104) that can be accessed by a distribution server 104. Such CPEs 106 comprise processors and associated computer memory adapted to store and run the downloaded or resident application. In the present context, at least a portion of the application is typically downloaded to the CPE 106, wherein the latter executes the downloaded application(s)/components, although it will be recognized that all of applications may conceivably be uploaded to the server, or alternatively transferred to another device, such as other networked CPE or the like. Applications may be (i) "pushed" to the CPE (i.e., wherein the distribution server causes the application download to occur), (ii) "pulled" to the CPE (i.e., where the CPE causes the download), (iii) downloaded as the result of some third entity or device (such as a remote server); (iv) resident on the CPE at startup; or (v) combinations of the foregoing.

Figure 1A:
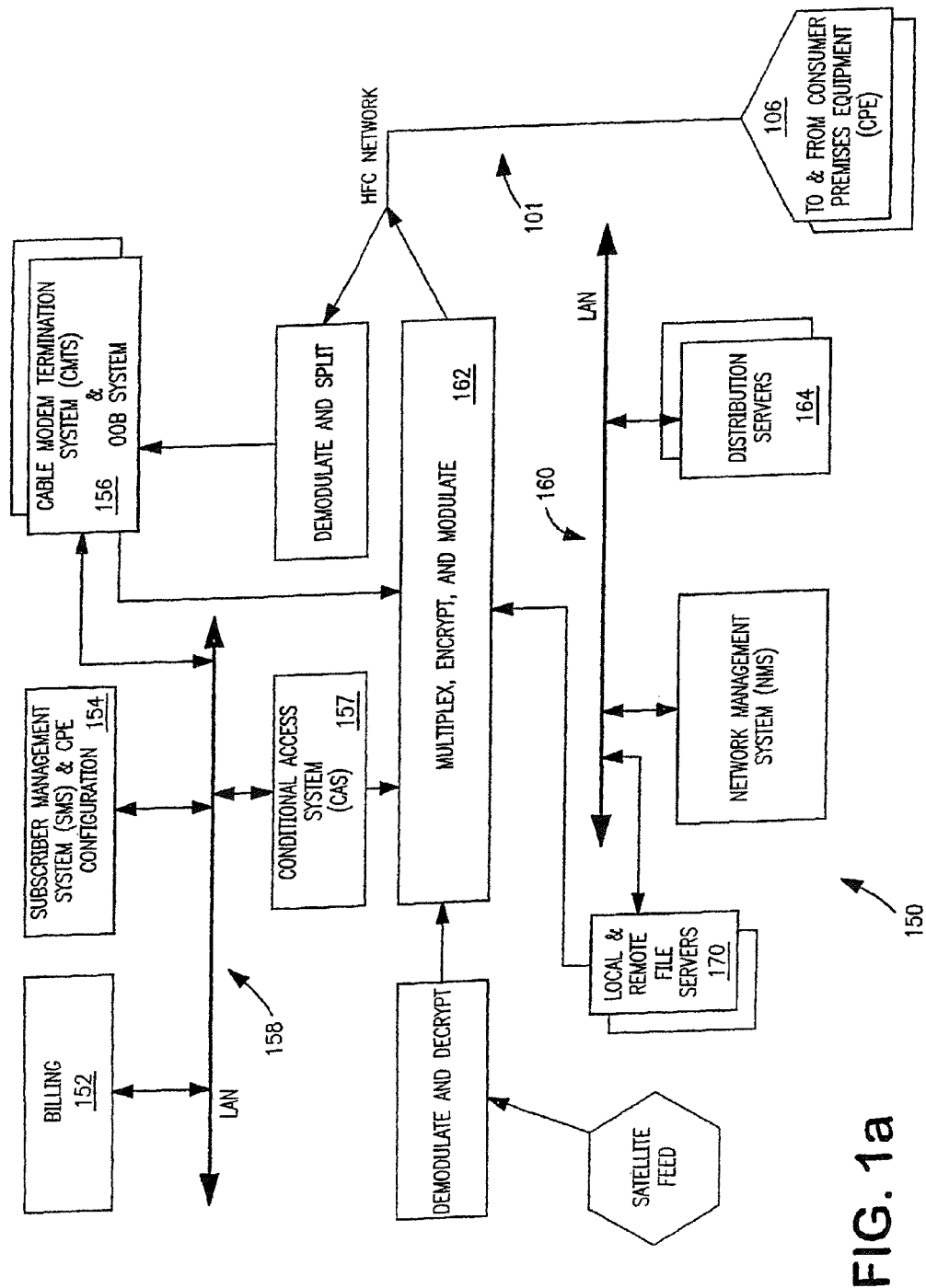
FIG. 1a is a functional block diagram illustrating one exemplary head-end configuration of an HFC network useful with the present invention.

Referring now to FIG. 1a, one exemplary embodiment of the network head-end architecture useful with the invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. In the present context, the distribution servers 104 are coupled to the LAN 160, which provides access to the MEM 162 and network 101 via one or more file servers 170. In the typical HFC network, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (not shown).

Content (e.g., audio, video, etc.) is provided in each downstream (in-band) channel. To communicate with the head-end, the CPE 106 uses the out-of-band (OOB) or DOCSIS channels and associated protocols. The OCAP 1.0 specification provides for networking protocols both downstream and upstream. To distribute files and applications to the CPE 106, the files and applications are configured as data and object carousels and may be sent in both the in-band and OOB channels. As is well known in the art, a carousel may be viewed as a directory containing files. The files of the carousel utilized herein are sent in a continuous round-robin fashion. If the client device misses a desired or necessary file in one carousel transmission, it can wait for the next. Alternatively, in another embodiment, the CPE portion of the application is configured as part of the program content on a given in-band or DOCSIS channel. As yet another embodiment, the CPE portion is downloaded directly using IP (Internet Protocol) packet traffic in an Out-Of-Band channel. Note that the file carousel or other device providing the application to the CPE 106 via the aforementioned communication channels may be the distribution server 104 previously described, or alternatively a separate device which may or may not be physically co-located with the server (e.g., remote file servers 170 of FIG. 1a). For example, a remote file storage device (not shown) with carousel capability may be in data communication with the client device(s) via an out-of-band communications channel as described below, the download of the application files from the remote device being initiated by way of a query from the client device, or alternatively a signal generated by the server 104 and transmitted to the remote device. Many other permutations of the foregoing system components and communication methods may also be used consistent with the present invention, as will be recognized by those of ordinary skill in the field.

Figure 2:
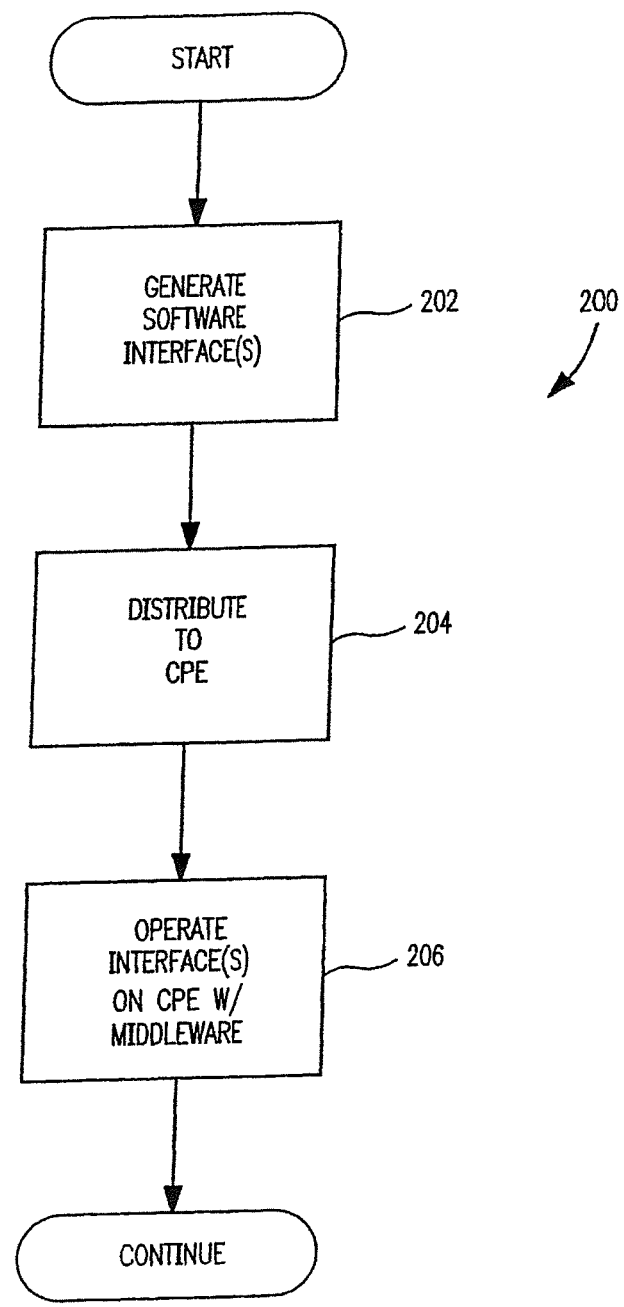
FIG. 2 is a logical flow diagram illustrating one exemplary embodiment of the event logging and management methodology according to the invention.

Referring now to FIG. 2, a first exemplary embodiment of the generalized error logging methodology of the invention is described. As shown in FIG. 2, the first step 202 of the methodology 200 comprises generating a suitable software interface (e.g., application programming interface, or API) adapted to provide access to the error logging services and capabilities described subsequently herein. Software interface generation methods are well known in the art, and accordingly not described further herein. It will be recognized that while the following discussion is cast in terms of traditional forms of APIs (such as those rendered in Java language), other types of interfaces may be utilized.

The software interface generated in step 202 is particularly adapted to provide the CPE to which it is distributed with enhanced error-logging capabilities. This is accomplished via association within an application downloaded or otherwise provided to the CPE, such as a trusted OCAP-compliant monitor application of the type well known in the cable software arts. The trusted application, via the APIs, in effect registers to receive various types of messages and exceptions.

Note that the interface(s) provided with the trusted application may be generic in nature, such as for example one or more APIs having a predetermined configuration or standardization. Alternatively, the interface(s) may be customized to the particular application or CPE to which it will be distributed. Combinations of standardized and non-standardized/customized APIs may be utilized as well in order to differentiate various services or features within the error logging system.

Per step 204, the API(s) generated in step 202 are distributed to the CPE 106, such as via one or more trusted network applications. For example, OCAP 1.0 specifies that applications are Java-based. OCAP uses the Java-based permission scheme to provide various capabilities to applications in the network. Signed (trusted) applications are capable of receiving permissions in addition to those available to unsigned applications. In addition, an MSO or other entity can selectively assign application permissions to trusted applications of their choice. Monitor application permissions defined by OCAP give an application the ability to perform system level functions such as rebooting the CPE 106.

The distribution of the trusted application/APIs per step 204 may occur directly over a primary content channel of the network, via one or more OOB channels, via an alternate network interface to the CPE (e.g., Internet download via DSL or dial-up connection), or even via hard media such as CD-ROM provided to the CPE user. The API(s) may be delivered with the target "trusted" CPE application, such as at time of configuration of the CPE by the network operator or at time of manufacture, or alternatively delivered subsequently to the CPE after setup, such as in the form of discrete software modules which are appended to or otherwise integrated with the existing target (trusted) application. Hence, the API(s) may be both included in new installations, as well as being retrofit onto older or existing CPE. As will be recognized by those of ordinary skill, myriad different schemes for delivery of the API(s) may be used consistent with the invention described herein.

Lastly, per step 206, the distributed API(s) is/are operated in conjunction with the monitor or other middleware and network to provide error logging, diagnosis, and/or correction capabilities. In one exemplary configuration, the APIs and CPE target application operate only to register and log errors as described in greater detail below. This baseline configuration may be optimal for very "thin" or low-end client devices where only a minimal logging and recovery capability is desired, or where only minimal subscription service options are selected by the consumer (e.g., basic service). Alternatively, more capable API packages and applications may be provided which provide enhanced error logging, diagnosis, and recovery capabilities.

Figure 2A:
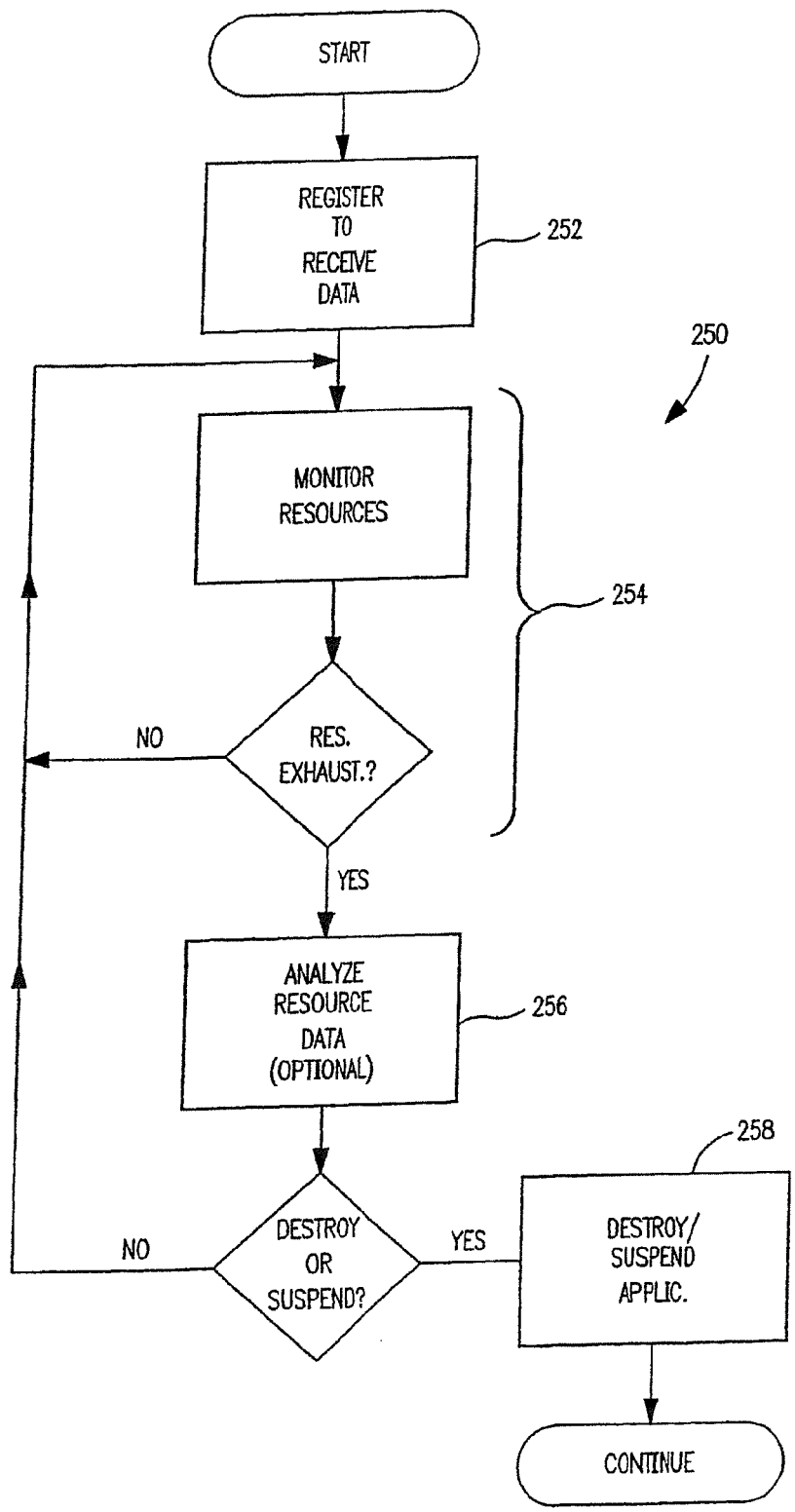
FIG. 2a is a logical flow diagram illustrating an exemplary method of registering for resource exhaustion events using the error logging system of the invention.

A second registration mechanism is also optionally provided by the invention, whereby the trusted application can be informed when system resources are nearing exhaustion, and make decisions regarding destruction of unnecessary or low priority applications, in order to attempt to recover needed resources (see FIG. 2a). Additional "intelligence" is programmed into the trusted (e.g., monitor) application, or other software which signals the monitor, to analyze relevant data and identify these conditions or trends. This approach, while ostensibly consuming more resources within the CPE during normal operations (due to increased software overhead resident on the CPE), advantageously allows the monitor or other trusted application to potentially identify trends or other artifacts within resources or running applications, and take appropriate action before an error or other deleterious event is encountered. This approach also provides enhanced continuity of operations for the user and network operator, thereby increasing the satisfaction of the former and the revenue generation of the latter.

In the exemplary method 250 of FIG. 2a, the trusted application is first registered to receive signaled data relating to resource exhaustion and utilization (step 252). Where the trusted (e.g., monitor) application in the CPE 106 detects an impending exhaustion of memory or CPU via the aforementioned signaling/registration (step 254), it can optionally analyze the data (step 256) and selectively suspend or destroy one or more applications in anticipation of the exhaustion (step 258). This avoids failure or interruption of the in-focus application running on the CPE and presenting a seamless user experience. As described in greater detail subsequently herein, this destruction may occur according to any number of different schemes, such as based on a fixed parameter associated with the application(s) (e.g., application size), a variable parameter associated with the application (e.g., number of resource or service calls issued per unit time), or other static or dynamic prioritization scheme.

The trusted application of the present invention may also be configured with additional intelligence wherein periodic, situational, or deterministic polling of other applications and resources is conducted, and/or corrective actions for error recovery are implemented by the trusted application(s). For example, the trusted application may be configured to recognize situations and/or applications where the likelihood of particular types or errors is increased, and adjust its operational characteristics accordingly. Such recognition may be based on historical data logged by the trusted application (e.g., where a given application or combination of applications has caused a particular type of error in the past), or alternatively on more inductive faculties provided to the monitor (e.g., the analysis and recognition of combinations of two or more parameters or events within the CPE which are known to increase the likelihood of errors).

Figure 3:
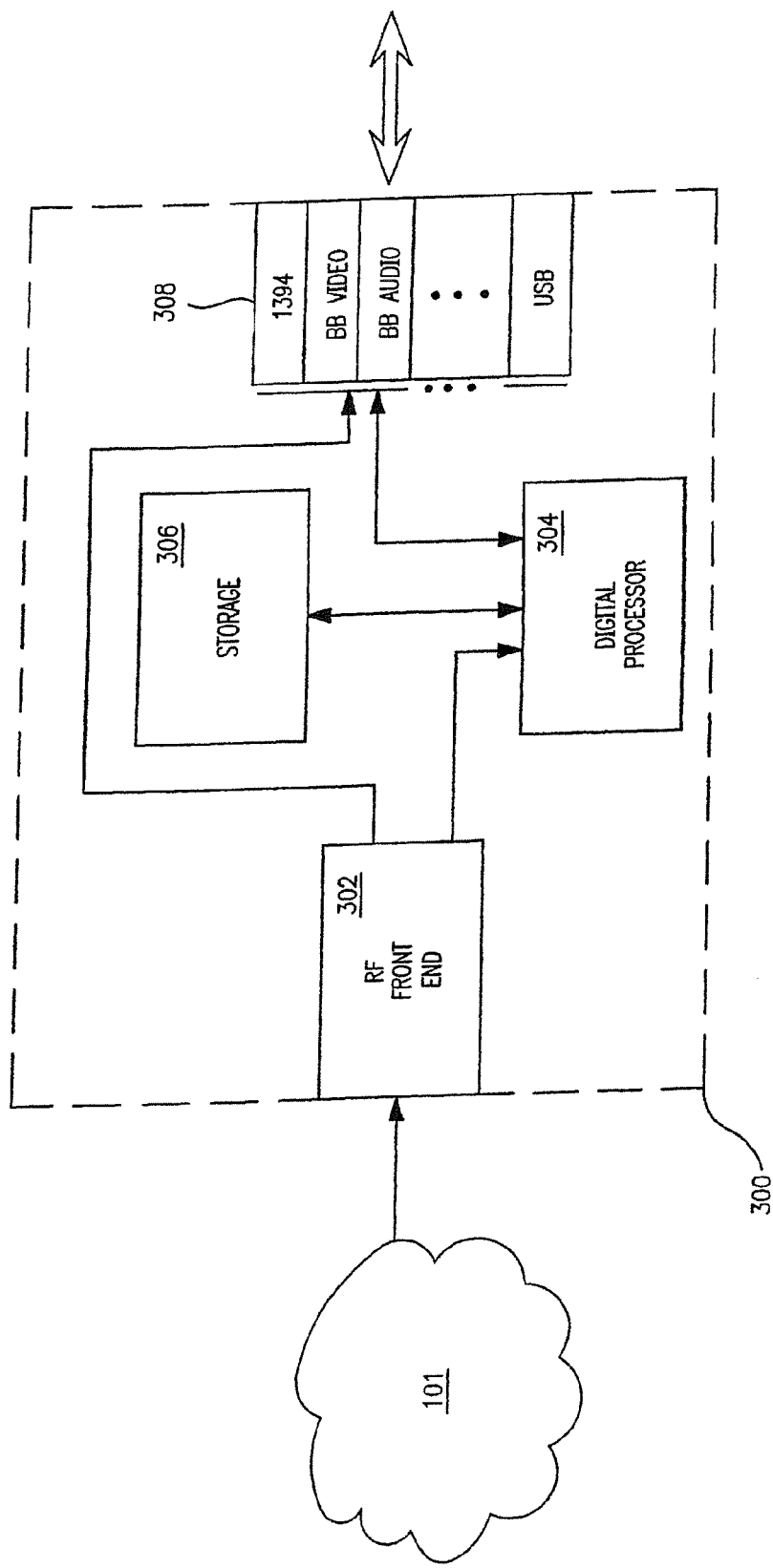
FIG. 3 is a functional block diagram of exemplary CPE having the improved error logging and management system.

FIG. 3 illustrates a first embodiment of the improved electronic device with error logging capability according to the present invention. As shown in FIG. 3, the device 300 generally comprises and OpenCable-compliant embedded system having an RF front end 302 (including modulator/demodulator) for interface with the HFC network 101 of FIG. 1, digital processor(s) 304, storage device 306, and a plurality of interfaces 308 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 3 for simplicity) include RF tuner stages, various processing layers (e.g., DOCSIS MAC, OOB channels, MPEG, etc.) as well as media processors and other specialized SoC or ASIC devices. These additional components and functionality are well known to those of ordinary skill in the cable and embedded system fields, and accordingly not described further herein.

The device 300 of FIG. 3 is also provided with an OCAP 1.0-compliant monitor application and Java-based middleware which, inter alia, manages the operation of the device and applications running thereon. It will be recognized by those of ordinary skill that myriad different device and software architectures may be used consistent with the hardware registry of the invention, the device of FIG. 3 being merely exemplary. For example, different middlewares (e.g., MHP, MHEG, or DASE) may be used in place of the OCAP middleware of the illustrated embodiment.

As previously described, the error logging functionality of the invention is embodied primarily in (i) the device middleware, including APIs specific to the error logging system, (ii) the on-board or remote storage available to the CPE, and (iii) an optional network agent or other entity in communication with the error logger. In the illustrated embodiment (FIG. 3a), the trusted application 352 is configured to register to receive events 354 such as error messages explicitly sent by a running application 356, Java exceptions and errors thrown (but not caught) by the application, resource depletion events, reboot events not caused by the monitor application 352, or other types of occurrences such as, for example, a "power-on" message. These error messages are received in real-time by the optional event handling agent. If no such agent is registered, the events are dropped. If such an agent is registered it may store the event messages on a storage device for retrieval by a network server agent.

The error logging system 350 allows the registered trusted application 302 to store the information received by such events. The events are stored, for example, in the form of human and/or machine-readable files or records within the storage device 306 disposed on the CPE 106 (e.g., RAM, ROM, memory card, hard drive, etc.), although the data may also be sent or streamed off-CPE to a remote storage location if desired.

The use of human-readable error logs or records within the storage device 306 of the exemplary embodiment advantageously allows an analyst (which may comprise anyone ranging from the consumer to MSO personnel to a third party provider) to rapidly evaluate the type and cause of the error. For example, the human readable data may include the date/time of the event, category of the event, source application or entity, CPE type, a log of other applications running at the time of the event, any recently monitor-initiated reboot events, etc. This aids the analyst in diagnosing the problem rapidly, and instituting corrective action as required. Note that the "analyst" may also comprise a software entity or other process which is adapted to automatically review certain fields within the stored event report, and initiate further actions based thereon. In this latter context, it may none-the-less be desirable to retain the human-readable format in the event that the software analyst is not successful in its resolution.

As used above, the term "other use" may comprise anything ranging from immediate, concurrent use of the information by the monitor or another entity or agent (e.g., another application 362 running on the CPE 106, or a network agent 364) to subsequent use (e.g., transmission via a network agent to the MSO and analysis thereby).

In one exemplary embodiment, the logged data is retrieved by a network agent 364 at a point in time that is convenient or optimal for the network agent or for the network as a whole. For example, periodic polling of connected CPE 106 by a network agent 364 tasked with collecting network-wide error or failure data may be used. As another alternative, an "immediate" approach may be used (e.g., over any available channel, or in conjunction with a carrier access technique such as FDMA, TDMA, ALOHA, or CSMA/CD on an OOB channel), wherein error messages are promptly sent to the network agent, proxy, or other network process when received and processed by the monitor application on the CPE. These event messages may be generated consistent with any number of well-known communications protocols and transmitted via literally any type of communications channels, whether in-band, out-of-band, or completely unrelated to the bearer network. For example, an upstream OOB channel is used in one embodiment to transmit TCP/IP protocol messages. In another embodiment, the CPE 106 is 3G-enabled (e.g., WAP/WTLS or GPRS) and utilizes a wireless CDMA, GSM, or satellite uplink to PSDN or similar infrastructure. Many other alternatives are possible and readily implemented by those of ordinary skill given the present disclosure.

In yet another embodiment, a priority-based approach is implemented wherein the registered trusted application is programmed by the network operator (such programming which may be situationally invoked by the head-end 100, agent 364, or CPE 106 itself) to deliver them according to the priority scheme. Any event logging entity (i.e., application or implementation) sets the event priority when logging an event. For example, a three-tiered classification system may be used which classifies errors or other events as being either "catastrophic", "recoverable", or "informational" in nature. It will be recognized that this three-tier system is merely illustrative of the broader concept of a multi-tiered classification approach; any number of different classes and types of event (some which may overlap other classes/types) may be used consistent with the invention. The following exemplary event type range scheme is used in conjunction with the Java code appended hereto to identify and store different event types:

- 0x00000000-0x0FFFFFFF—reserved for informational message types;
- 0x10000000-0x1FFFFFFF—reserved for recoverable error types;
- 0x20000000-0x2FFFFFFF—reserved catastrophic error types;
- 0x30000000-0x3FFFFFFF—reserved for reboot events;
- 0x40000000-0x4FFFFFFF—reserved for resource depletion events; and
- 0x50000000-0xFFFFFFFF—reserved for proprietary use.

Along with an event type code each event logged may include a human readable string message and in the Java case a String that indicates a stacktrace of the most recently called methods and an array of Strings that indicate the class hierarchy of the error or exception, otherwise known as a Throwable object.

Catastrophic and recoverable events may instigate generation of an immediate message to the network agent or other cognizant entity, while informational events may be issued on an as-available basis, or alternatively bundled into a common message with other informational events (or higher priority "targets of opportunity" concurrently being issued by the monitor) in order to reduce processing overhead and bandwidth consumption. A plethora of different prioritization schemes for various types of errors and events will be readily apparent to those of ordinary skill given the present disclosure.

The foregoing prioritization approach also provides, inter alia, the ability for the agent 362, 364 to apply its own prioritization mask (e.g., message handling algorithm) in dealing with one or more such event messages. Where multiple event messages are received by the cognizant agent in close temporal proximity, such as where a streamed application or content may be adversely affecting a class of CPE or customers for whatever reason, the agent can prioritize action on these messages according to its own mechanisms or those of a parent entity, which may or may not consider the priority of the event message issued by each CPE. For example, one approach handles all events in order of priority and time of message issuance (or receipt) as determined by the message local time stamp; i.e., process all catastrophic events in time-order sequence until exhausted, then process all recoverable alerts in time-order sequence until exhausted, and so forth.

Alternatively, other information can be used within the agent's message handling algorithm in place of or in conjunction with the priority/timing information, such as geographic location, customer subscription class (e.g., basic or "full service"), etc. Similarly, the handling algorithm of the agent may be configured to analyze the content of one or more classes of message (e.g., all catastrophic event messages) immediately upon receipt in order to extract additional data or information as to the nature of the event, such additional data being useful in further prioritizing the events for follow-on action by the agent or its proxy.

It will be recognized that the aforementioned error message handling paradigms may also comprise a multi-tiered or decoupled approach to the actual data transmission. For example, in one exemplary variant, the error logging system 300 of the invention (FIG. 3) is adapted to use short, low-overhead "signaling" messages which are issued by the monitor, or a designated proxy process, to the network agent in lieu of a complete transmission of the logged error data. These signaling messages may be used, for example, to alert the agent as to the existence of an error/event condition (including priority level, if desired) on one or more CPE 106 which has been logged into local storage on the affected CPE.

As will be described in greater detail below, certain errors and events can be handled sufficiently by assets within the CPE 106 itself, thereby not requiring additional intervention by the MSO, user, etc. Accordingly, the improved monitor application described herein (or another associated "local" agent process disposed on the CPE) can in effect pre-process any error messages to (i) log all pertinent data relating to the event for later use; (ii) determine if any corrective action is required; and (iii) determine whether the required corrective action can be effectuated by the monitor application or other resident process. Where additional intervention beyond that which the monitor can provide is required, an event message of the type described above may be issued to the network agent or other comparable entity to initiate such intervention.

Figure 4:
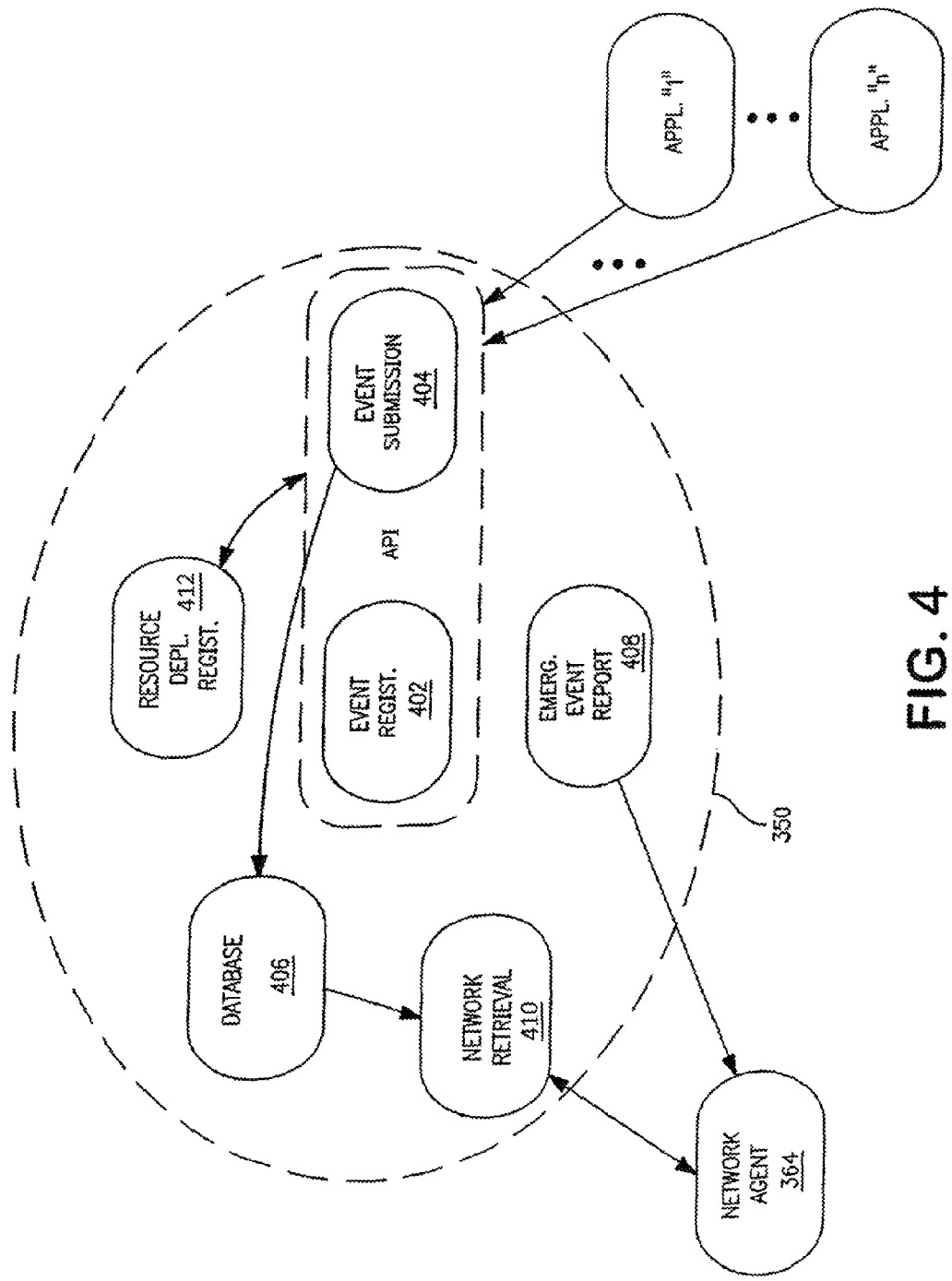
FIG. 4 is a logical block diagram illustrating the relationships between the various entities associated with the error logging system of the invention.

Referring now to FIG. 4, the various components of an exemplary error logging system according to the invention are described in greater detail, in the context of a Java-based programming environment. This environment is selected for its ease of programming and implementation, especially in conjunction with the system architecture of FIGS. 3 and 3*a*. It will be readily appreciated, however, that the use of Java in this embodiment is merely illustrative; the various logging system components advantageously may be implemented using any one or more different computer languages (including, without limitation C, C++, and Ada), and within various middleware environments (e.g., MHP, OCAP, MHEG, DASE), thereby providing significant flexibility of design. Furthermore, the following discussion illustrates but a sample of the possible constructs within the Java environment that are useful with the broader principles of the invention. For purposes of illustration, other "real-world" issues such as multi-threading have been omitted from the sample code provided herein (Appendices I-XV); however, such issues are readily addressed by those of ordinary skill provided the present disclosure.

As shown in FIG. 4, the error logging system 350 generally consists of the following major components: (i) an event registration entity 402; (ii) an event submission entity 404; (iii) an event database 406; (iv) an emergency event reporting entity 408; (v) a network event retrieval entity 410; and (vi) a resource depletion registration entity 412. These various entities are now discussed in greater detail. It will be recognized that not all of the entities listed above are required for operation of the event logging system 350; rather, various levels of functionality can be achieved by adding more or less of these entities as appropriate. Hence, the system 350 is inherently modular.

Furthermore, it will be appreciated that other types of entities (and configurations of each) may be utilized, the following being merely illustrative of the broader principles.

Event Registration Entity—

This entity 402 comprises a software process which provides the system 350 with a mechanism to register to receive error/event and informational messages from other applications or processes within the CPE 106, including notification of (non-monitor initiated) reboot events, and reason(s) there for. In the exemplary embodiment, it is rendered within the OCAP Implementation using an API.

Appendix I provides code describing an exemplary system registration handler which provides event registration within the system 350.

Appendix II provides exemplary code implementing extensions of system basic permission for the trusted application registering to handle logged events. In OCAP this permission is unnecessary and can be added to the existing monitor application permission class.

Appendix III provides exemplary code implementing the event handler which was registered by the trusted application and called by the implementation when an event is logged. Appendix IV provides a sample error handling application using the IEventHandler of Appendix III.

Event Submission Entity—

This entity 404 provides the system 350 with the mechanism by which applications may log an error/event message with the system or the registered trusted application. As previously described herein, messages can be logged using any number of different priority schemes (such as the three-tiered catastrophic/recoverable/informational approach). Appendix V provides exemplary Java code implementing an EventProcessor class used for handling event submissions from applications. Appendix VI provides exemplary error event code implementing an error event class. This class represents an event returned by the system when an uncaught exception or error is encountered. Appendix VII provides exemplary code implementing message-based events (e.g., informational, recoverable, catastrophic, reboot, etc.). Appendix VIII provides exemplary code implementing reporting of a reboot event within the CPE (via the IMessageEvent of Appendix VII). Appendix IX provides a sample reboot generating system for generating trusted application (e.g., monitor application) reboot events.

Event Database—

The event database 406 comprises in the illustrated embodiment a message database wherein a trusted application may store error and informational messages for retrieval by a network agent or other entity (whether local or remote from the database/CPE). The illustrated database 406 is disposed on the CPE 106 itself, although it will be appreciated that other locations may be used including, for example, other devices within the particular end-user environment, MSO operated networked servers, or even third-party servers or storage facilities. Appendix X provides exemplary Java code implementing a sample error logging application for logging events within the database 406. Appendix XI provides a sample application for handling reboot events, including disposing them within an array of the database 406.

Emergency Event Reporting Entity—

This entity 408 comprises a network communications definition for, e.g., immediate delivery of select event/error and informational messages by a trusted application (such as the OCAP-compliant monitor described above) to a network agent or other entity. This provides the system 350 with a rapid mechanism to alert the MSO or another remote entity of impending or existing trouble within the CPE. In the illustrated embodiment, this entity 408 comprises a message system whereby a registered error handler determines that the error or event is critical enough to inform the network agent immediately. A client-server architecture of the type well known in the networking arts is used to implement this system, although other approaches (including the various message distribution and prioritization schemes discussed previously herein) may be substituted with equal success.

Remote Event Retrieval—

This entity 410 comprises a (network) communications definition for retrieval of messages in the message database by an agent, the latter which may be internal or external to the CPE 106, such as a remote network agent. This is to be contrasted with the emergency reporting entity 408, which is tasked with issuing alerts of one form or another to the agent. As with the emergency event reporting entity 408, the event retrieval entity 410 of the exemplary embodiment comprises a client-server based message system whereby the agent polls clients based on, e.g., a round-robin schedule arranged to minimize network impact, or any other selected scheme as previously described herein. Hence, this entity 410 provides access to stored data and records of the CPE irrespective of their priority.

Resource Depletion Registration Entity—

This entity 412 comprises a mechanism to register to receive messages regarding the incipient exhaustion of system resources such as memory and CPU bandwidth. As discussed previously herein, a variety of different schemes may be used to determine (i) proximity (in time or another parameter) to an exhaustion event; (ii) the priority associated with any data or messages received by the mechanism 412; and (iii) the corrective actions to be initiated in response to the message. For example, where impending memory exhaustion is detected (such as through periodic or situational comparison of data representing the current available memory to the total or nominal memory capacity of the CPE), a message will be issued to the depletion registration entity 412 indicating the same. Depending on how emergent the need for action is, the message may be coded as to priority level; e.g., low, medium, or high priority. The depletion entity 412, upon receipt of the message, may be configured to selectively destroy running applications according to a secondary priority scheme (which may, for example, be dictated by the monitor application running on the CPE 106 or another entity in communication with the CPE 106); e.g., destroy applications according to a particular sequence or hierarchy, such as largest first, non "in-focus" first, etc. Myriad other schemes are possible. The MHP and OCAP standards, for example, specify functionality that provides an application destruction hierarchy which may be used with the invention.

Appendix XII provides exemplary Java code implementing the notification (i.e., in the form of a ResourceDepletionEvent class) within the system when a resource depletion event occurs. Appendices XIII and XIV provide code illustrating exemplary resource depletion event generating systems and resource depletion event handling applications, respectively.

Appendix XV provides exemplary code implementing the class for testing of the reboot, event (error), and depletion handlers.

In addition to the foregoing, the event logging system of the present invention is also optionally provided with other functional entities which perform various purposes within the system relating to error/event handling. Specifically, a trusted application priority entity (not shown) is optionally provided to indicate to the system 400 that the trusted application shall handle near-exhaustion events, and that the system handlers of such events should provide no handling of such events. In the case of the attached exemplary code, the act of registering for depletion event receipt (by the depletion entity 412) performs this task as well. Alternatively, these functions may also be separated so that an application can register to receive the event messages, but not be required to act upon them, other than to record the event and perhaps send it to a network agent or other entity ("record and relay" function).

The error logging system of the present invention can also advantageously be used without interfering with other functions resident in the CPE, such as for example the hardware registry described in co-owned and co-pending U.S. patent application Ser. No. 10/723,959 Nov. 24, 2003 and entitled "METHODS AND APPARATUS FOR HARDWARE REGISTRATION IN A NETWORK DEVICE", incorporated herein by reference in its entirety. For example, events or errors generated through access or manipulation of the hardware registry and its various associated options (such as a hardware failure or contention deadlock) can be stored and accessed as desired by a network agent in order to troubleshoot such errors, and potentially obviate service calls relating thereto.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus configured for operation with a content delivery network, said apparatus comprising:
    a network interface configured to communicate with said content delivery network;
    a digital processor;
    a storage device operatively coupled to said processor;
    middleware configured to run on said processor;
    a software entity configured to manage a plurality of resources; and
    a plurality of software applications configured to run on said processor;
    wherein said apparatus is further configured to, in cooperation with said middleware:
        identify first event type data associated with an event related to insufficient resources during operation of said apparatus;
        based on said identification of said first event type data, resolve said event related to insufficient resources via selective termination of one or more of said plurality of software applications by said software entity;
        identify second event type data comprising one or more of a catastrophic error type data or a recoverable error type data; and
        based on said identification of said second event type data, cause generation and transmission to said content delivery network of an immediate message comprising said second event type data.

2. The apparatus of claim 1, wherein said content delivery network comprises a managed content delivery network.

3. The apparatus of claim 1, wherein said apparatus is further configured to store said first event type data and said second event type data in said storage device.

4. The apparatus of claim 1, wherein said software entity comprises a monitor application.

5. The apparatus of claim 1, wherein said resolution further comprises generation of a notification message of said selective termination.

6. The apparatus of claim 1, wherein said selective termination is based at least in part on a priority associated with respective software applications of said plurality of software applications.

7. The apparatus of claim 1, wherein said apparatus is further configured to, in cooperation with said middleware:
    identify third event type data comprising an informational event type data, and
    based on said identification of said third event type data, bundle said informational event type data into a common message comprising one or more other informational event type data.

8. The apparatus of claim 7, wherein said apparatus is further configured to store said third event type data in said storage device.

9. A method of operating consumer premises equipment (CPE) in operative communication with a content delivery network, said method comprising:
- determining whether sufficient resources are available for utilization by a plurality of software applications currently running on said CPE;
- upon a determination that there are insufficient resources, selectively terminating one or more of said software applications;
- generating data related to said determination of insufficient resources and said termination; and
- in response to a periodic communication from said network, providing said generated data thereto.

10. The method of claim 9, wherein said act of selectively terminating is performed at least in part by a monitoring application resident on said CPE.

11. The method of claim 10, wherein said content based network comprises a managed network.

12. The method of claim 9, further comprising storing said generated data within a storage device of said CPE.

13. The method of claim 12, wherein said selectively terminating comprises causing sufficient resources to become available for at least remaining ones of said plurality of software applications.

14. The method of claim 9, further comprising utilizing said generated data to notify said content delivery network.

15. An apparatus configured for operation within a content distribution network, said apparatus comprising:
- a digital processor;
- a storage device operatively coupled to said processor;
- middleware configured to run on said processor;
- a software entity configured to manage a plurality of resources; and
- a plurality of software applications configured to run on said processor;
- an event submission entity comprising a software process configured to permit at least one software application of said plurality of software applications to log an error or event message;
- wherein said apparatus is further configured to, in cooperation with said middleware:
  - identify an instance of insufficient resources related to concurrent operation of said plurality of software applications by said software entity; and
  - implement a remedial action comprising a selective termination of one or more of said plurality of software applications in response to said identification of said instance of insufficient resources.

16. The apparatus of claim 15, wherein said content distribution network comprises a managed network operated by a network operator.

17. The apparatus of claim 15, wherein said remedial action is configured to free an amount of resources sufficient for operation of remaining ones of said plurality of software applications.

18. The apparatus of claim 15, wherein said selective termination is based on a priority associated with respective ones of said plurality of software applications.

19. The apparatus of claim 15, wherein said apparatus is further configured to store data related to said identification of said insufficient resources within said storage device.

20. The apparatus of claim 15, wherein said event submission entity is configured to permit said at least one application to log an error or event message with a trusted application associated with said software entity.

21. A method of operating client equipment in operative communication with a content delivery network, said method comprising:
- determining whether sufficient resources are available for utilization by a plurality of software applications operative to run on said client equipment;
- upon a determination that there are insufficient resources, selectively terminating one or more of said software applications;
- generating data related to said determination of insufficient resources and said termination; and
- utilizing said generated data to notify said content delivery network.

22. The method of claim 21, wherein the determining comprises utilizing one or more trusted computer programs resident on the client equipment to receive event notifications or exceptions generated by one or more of the software applications, and the method further comprises providing, in response to a periodic communication from said network, said generated data to a designated network entity.

* * * * *

UNITED STATES PATENT AND TRADEMARK OFFICE
CERTIFICATE OF CORRECTION

| | | |
|---|---|---|
| PATENT NO. | : 9,674,287 B2 | Page 1 of 1 |
| APPLICATION NO. | : 14/451303 | |
| DATED | : June 6, 2017 | |
| INVENTOR(S) | : Patrick Ladd et al. | |

It is certified that error appears in the above-identified patent and that said Letters Patent is hereby corrected as shown below:

On the Title Page

Currently reads ((74) Attorney, Agent, or Firm):
"(74) Attorney, Agent, or Firm – Gardzinski & Associates, PC"

Should read:
-- (74) Attorney, Agent, or Firm – Gazdzinski & Associates, PC --

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*